United States Patent
Ota et al.

[11] Patent Number: 5,886,977
[45] Date of Patent: *Mar. 23, 1999

[54] DISK UNIT AND PROCESS FOR ASSEMBLING TRANSMISSION MECHANISM USED FOR DRIVING HEAD CARRIAGE

[75] Inventors: Toshiro Ota, Kanagawa; Masakatsu Hosoya, Chiba; Takashi Yamazaki, Kanagawa, all of Japan

[73] Assignee: Sony Corporation, Tokyo, Japan

[*] Notice: The term of this patent shall not extend beyond the expiration date of Pat. No. 5,777,978.

[21] Appl. No.: 903,527

[22] Filed: Jul. 30, 1997

Related U.S. Application Data

[63] Continuation of Ser. No. 432,173, filed as PCT/JP94/01510, Sep. 12, 1994, Pat. No. 5,777,978.

[30] Foreign Application Priority Data

Sep. 13, 1993 [JP] Japan ..................................... 5-226253

[51] Int. Cl.$^6$ .................................................. G11B 21/02
[52] U.S. Cl. ........................................... 369/219; 369/244
[58] Field of Search .................................... 369/215, 219, 369/244, 249, 251

[56] References Cited

U.S. PATENT DOCUMENTS

| | | | |
|---|---|---|---|
| 4,654,737 | 3/1987 | Hopkins et al. | 360/106 |
| 5,119,362 | 6/1992 | Yanagisawa | 369/215 |
| 5,307,339 | 4/1994 | Tanaka | 367/215 |

FOREIGN PATENT DOCUMENTS

| | | | |
|---|---|---|---|
| 60-80177 | 5/1985 | Japan . | |
| 60-234270 | 11/1985 | Japan . | |
| 61-29465 | 2/1986 | Japan | 369/215 |
| 63-11463 | 7/1988 | Japan . | |
| 63-206971 | 8/1988 | Japan | 369/215 |
| 2-83867 | 3/1990 | Japan | 369/215 |
| 5-325202 | 12/1993 | Japan . | |

*Primary Examiner*—David L. Ometz
*Attorney, Agent, or Firm*—Limbach & Limbach LLP

[57] ABSTRACT

Coil springs 96 and 97 are incorporated in a driving-side transmission mechanism 61 so as to absorb backlashes between a rack 55 and a drive gear 59a. Since the respective backlashes between the drive gear 59a and the rack 55 are absorbed by way of the coil springs 96 and 97, phase matching at the sole driving-side transmission mechanism 61 is required as phase matching work of toothed portions of gears during assembly, thereby simplifying the assembling task and shortening the amount of assembling hours. Additionally, since a coil spring is not included in the rack 55, the rack can be designed to be small-sized in its width direction, thereby minimizing the moment of a force about the meshed engagement point, acting on an optical head carriage 53, and reducing transfer loss in the head.

3 Claims, 36 Drawing Sheets

FIG. 19A
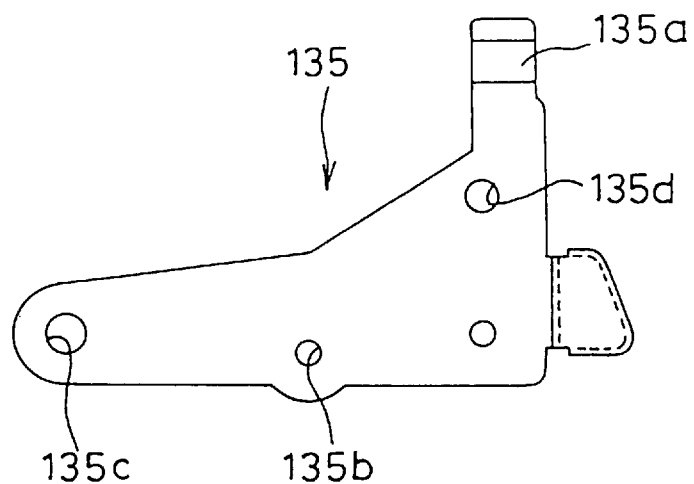
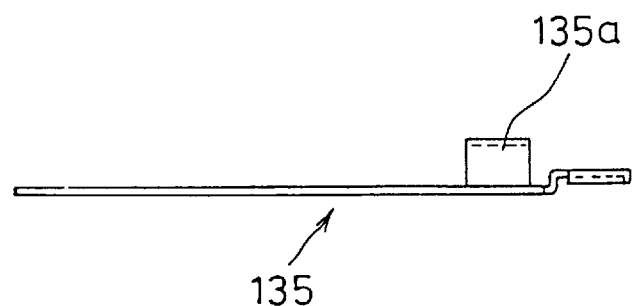
FIG. 19B

DISK UNIT AND PROCESS FOR ASSEMBLING TRANSMISSION MECHANISM USED FOR DRIVING HEAD CARRIAGE

This is a continuation of application Ser. No. 08/432,173, filed as PCT/JP94/01510 Sep. 12, 1994, now U.S. Pat. No. 5,777,978.

FIELD OF THE INVENTION

The present invention relates to a disk unit which is optimally used for a compact disk player, a CD-ROM drive or the like, and to a process for assembling a transmission mechanism used for driving a head carriage.

BACKGROUND ART

An optical disk unit is traditionally equipped with an optical pick-up device which is movable frontwards and backwards by means of a drive motor and a disk table which is rotatably driven by means of a spindle motor. An optical disk is placed on the disk table for rotation together therewith. As is generally known, the optical disk unit operates to read and reproduce a predetermined information signal recorded in a recording track through a record-tracking operation according to which the predetermined information signal is recorded by vertically emitting a laser beam generated from the optical pick-up device to the optical disk from its bottom, while transferring the optical pick-up device in a radial direction of the optical disk.

In such optical disk units, since the information signal recorded in the optical disk is read while transferring the optical pick-up device from the inner periphery of the optical disk to the outer periphery, there is a possibility that tracking error in the recording track results from error in transfer of the optical pick-up device and as a result the information signal is not read and thus a good reproduction cannot be made.

For the reasons indicated above, the driving-force transmission gear mechanism which is provided for transferring the optical disk unit, is conventionally equipped with a backlash eliminating mechanism, for eliminating backlash between a meshing pair of gears and for enhancing reliability in transfer of the optical pick-up device.

One such conventional optical disk unit will be hereinbelow explained in accordance with FIG. 39.

In this drawing, reference numeral 1 denotes a mechanical deck which is formed with a through window 1a being substantially rectangular from the plan view and opening in a vertical direction of the deck and a cut-out 1b being substantially semi-circular in the plan view and integrally formed with the through window 1a. The mechanical deck is disposed in a body (not shown) of an optical disk player.

Reference numeral 2 denotes a spindle motor which has an output shaft penetrating the cut-out 1b and is fixed on the reverse side (under surface) of the mechanical deck 1.

Reference numeral 3 denotes a disk table, on which the disk is placed, is fixed on the top of the output shaft 2a and has a driven connection with the spindle motor 2 for co-rotation therewith.

Reference numerals 4 and 5 denote a pair of right and left guide shafts respectively extending in the advancing and retreating directions of an optical head carriage as set out below. The guide shafts are arranged in parallel with each other in the body (not shown) of the player and fixed at the perimeter of the window 1a on the reverse side of the deck.

Reference numeral 6 denotes the optical head carriage which is provided for transferring an optical pick-up device 7 in the front and rear directions and slidably mounted on the guide shafts 4 and 5 through bushings 8.

Reference numeral 9 denotes a rack mechanism which is provided for transmitting a driving force produced by a motor. The rack mechanism consists of a first rack 10 extending frontwards and rearwards and fixed on one side of the optical head carriage 6, a second rack 12 extending frontwards and rearwards and slidably mounted on the upper surface of the first rack 10 through a spacer 11, and a compression coil spring 13 operably disposed between the first and second racks 10 and 12 for spring-loading them and serving as a backlash eliminating mechanism by producing the spring bias so that the two racks are spaced apart from each other.

Reference numeral 14 denotes a motor which is fixed on the upper surface of the mechanical deck 1 at one side of the latter for driving the head carriage. A motor gear 15 is fixedly attached to an output shaft 14a of the motor 14 in such a manner as to be placed at the reverse side of the mechanical deck 1.

Reference numeral 16 denotes a drive gear rotated by driving the motor 14. The drive gear is rotatably mounted on the reverse side of the mechanical deck 1 by way of a support shaft 17.

Reference numeral 18 denotes an intermediate driving-force transmission gear mechanism is provided for transmitting a driving force produced by the motor 14 to the optical head carriage 6. The intermediate transmission gear mechanism is mechanically linked to both the rack mechanism 9 and the drive gear 16 and consists of a driving-side transmission gear mechanism 19 and a driven-side transmission gear mechanism 20.

Of these transmission gear mechanisms 19 and 20 constructing the intermediate transmission gear mechanism 18, the driving-side transmission gear mechanism 19 consists of two gears 21 and 22 both being in meshed engagement with the drive gear 16 and being rotatably disposed, and a compression coil spring 23 serving as a backlash eliminating mechanism which acts to bias the respective gears 21 and 22 in their opposite peripheral directions.

Of these gears 21 and 22, the gear 21 is integrally formed with an upwardly extending small gear 24 at its central portion.

On the other hand, the driven-side transmission gear mechanism 20 of the intermediate transmission gear mechanism 18 consists of two gears 25 and 26 both being in meshed engagement with the small gear 24 and being rotatably disposed.

Additionally, the gears 25 and 26 are in meshed engagement with the first and second racks 10 and 12, respectively.

In the optical disk unit as set forth above, the driving force produced by the motor 14 is transmitted from the drive gear 16 through both the gears 21 and 22 of the driving-side transmission gear mechanism 19 and through both the gears 25 and 26 of the driven-side transmission gear mechanism 20 to the first and second racks 10 and 12 of the rack mechanism 9, with the result that the optical head carriage 6 can be moved along both the guide shafts 4 and 5 in the front and rear directions.

At this time, backlash between the drive gear 16 and the gear 21 and backlash between the drive gear and the gear 22 are both absorbed by means of the compression coil spring 23, while backlash between the gear 25 and the rack 10 and backlash between the gear 26 and the rack 12 are both absorbed by means of the compression spring 13. Additionally, the respective backlash between the small gear 24 and each of the gears 25 and 26 is absorbed by means of both the compression coil springs 13 and 23.

In the prior art optical disk units, since the two backlash eliminating mechanisms (the compression coil springs 13 and 23) are respectively provided in the rack mechanism 9 and the driving-side transmission gear mechanism 19, the prior art optical disk unit requires phase matching at respective toothed portions of the rack mechanism 9 and the driving-side transmission gear mechanism 19. This results in troublesome assembly task when totally assembling the respective mechanisms. Additionally, it takes a long time for assembly work.

Furthermore, since the compression coil -spring 13 is incorporated in the rack mechanism 9, the rack mechanism 9 is so designed as to have an undesirably larger dimension in its width direction. The above-noted larger dimension causes a long distance from the guide shaft 5 to the engaging point of the rack mechanism 9 and the driven-side transmission gear mechanism 20. As a result, when transferring the optical pick-up device 7, the moment of a force about the above-noted engaging point with regard to the optical head carriage 6 tends to increase, thereby increasing transfer loss in the head carriage.

SUMMARY OF THE INVENTION

It is, therefore, in view of the above disadvantages, an object of the present invention to provide a disk unit which is capable of facilitating its assembly task, of reducing assembling time, and of reducing transfer loss of a head carriage.

It is another object of the present invention to provide a disk unit which is capable of performing a smooth transfer of a head carriage.

An optical disk unit according to the present invention includes first and second backlash eliminating mechanisms respectively provided in a driving-side transmission gear mechanism for eliminating backlash between a rack and a drive gear.

Therefore, in case of the present invention, backlash between the rack and the drive gear is eliminated by means of the first and second backlash eliminating mechanisms incorporated in the driving-side transmission gear mechanism corresponding to an intermediate driving-force transmission gear mechanism. The disk unit made in accordance with this invention only requires phase matching at the sole driving-side transmission gear mechanism in order to achieve phase matching at the toothed portions of the driving-side transmission gear mechanism, with the backlash eliminating mechanism.

Additionally, since the backlash eliminating mechanism is not included in the rack, the dimension of the rack in its width direction can be set at a minimum possible dimension. Thus, when transferring a head, the moment of a force about the engaging point which moment acting on the head carriage becomes small.

A disk unit according to the invention may further include a head carriage equipped with a support shaft which shaft is arranged in parallel with axes of respective driving-force transmission gears for rotatably supporting the rack.

Therefore, in the unit of the invention, since the rack is rotatable about the support shaft, the load acting on the rack through the intermediate transmission gear mechanism is dispersed.

A disk unit according to the invention may further include openings which are respectively provided in a first driving-side transmission gear, a second driving-side transmission gear, and a lever, for the purpose of phase matching at the toothed portions.

Therefore, in the unit, phase-matching between toothed portions of the respective driving-side transmission gears of the driving-side transmission gear mechanism is made by matching all of the through openings of the first driving-side transmission gear, the second driving-side transmission gear and the lever.

BRIEF DESCRIPTION OF THE DRAWINGS

FIGS. 19(A) and 19(B) are a plan view illustrating a thrust receiving plate associated with both the intermediate transmission gear mechanism and the drive-gear mechanism in the disk unit of the invention and an elevational view illustrating the same, respectively.

DESCRIPTION OF THE PREFERRED EMBODIMENTS

Figure 1:
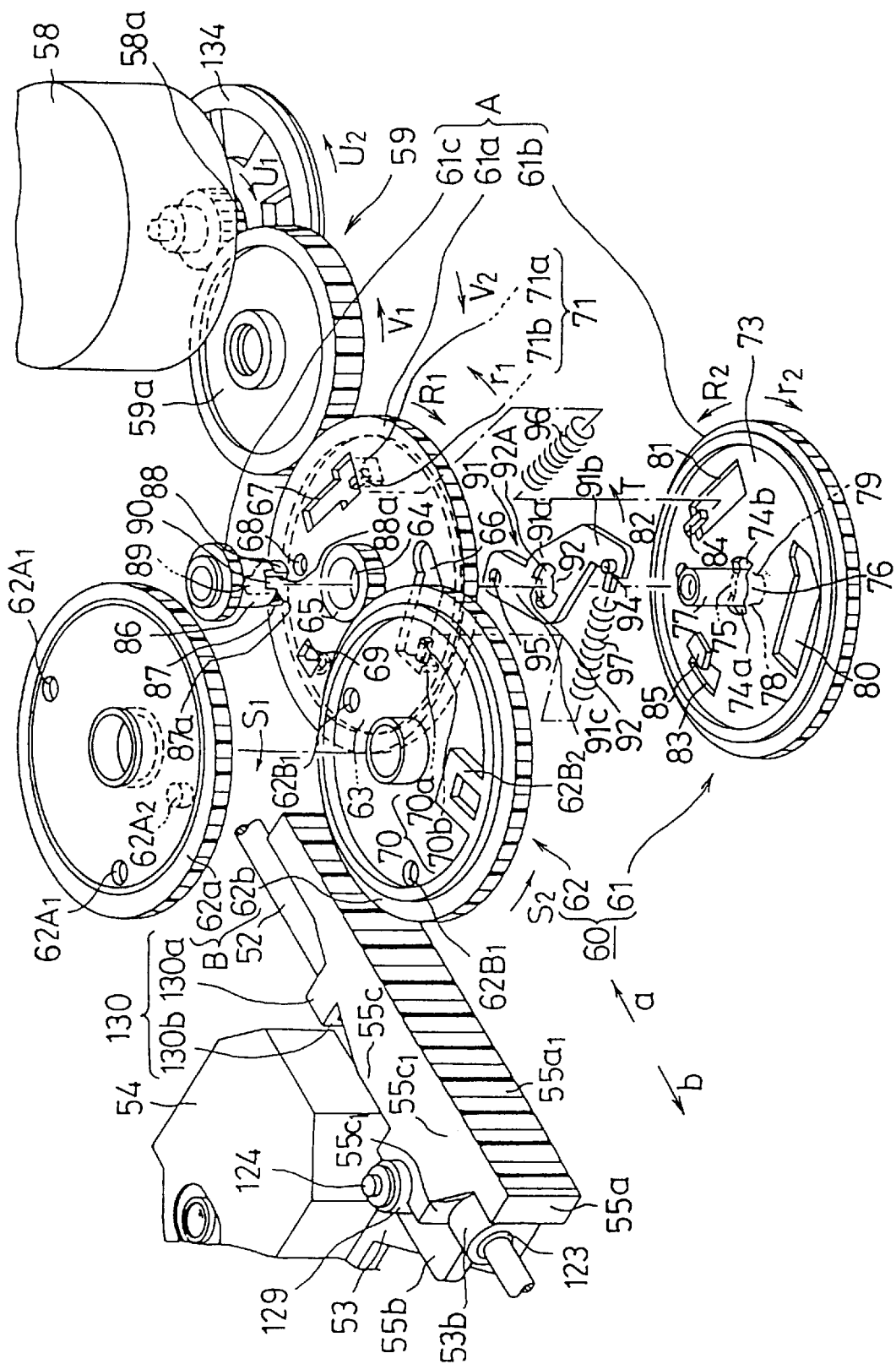
FIG. 1 is an exploded perspective view illustrating a transmission mechanism for use in a head carriage driving device incorporated in a disk unit according to the present invention.

The construction of the present invention will be hereinbelow described in detail on the basis of the embodiment shown in FIGS. 1 to 38.

In these drawings, denoted by reference numeral 100 is a body of an optical disk unit, which body has a front opening. The body is constructed by a substantially box-shaped casing 101 having a stainless-steel upper cover 101a and a stainless-steel lower cover 101b and a synthetic-resin front panel 102 fitted into the front opening of the casing 101 and having an opening 102a through which the disk tray goes in and out.

The body 100 accommodates therein a printed circuit board 103 which board is positioned above the lower cover 101b of the two covers 101a and 10b.

The front panel 102 of the body 100 is formed with an emergency eject hole 102b penetrating the outside of the panel to the inside. In the vicinity of the emergency eject hole 102b, an eject button 140 is inserted into the panel so that a portion of the button is projected outside of the panel.

Reference numeral 104 denotes a synthetic-resin disk tray which tray is constructed by a disk placing plate 105 and a front plate 106. The disk placing plate has a concavity 105a being substantially circle from the plan view and accommodating therein an optical disk D, and an opening 105b extending at the bottom area of the concavity 105a in the front and rear directions (directions indicated by the arrows b and a). The front plate is integrally formed with the disk placing plate 105 at the front end of the latter, for opening and closing the above-mentioned opening 102a. The disk tray advances to and retreats from the casing 101.

The disk placing plate 105 of the disk tray 104 is integrally formed with projected portions 105c flanged from both sides of the tray to guide the tray and with additional projected portions 105d provided for restricting the movement of the tray.

Figure 21:
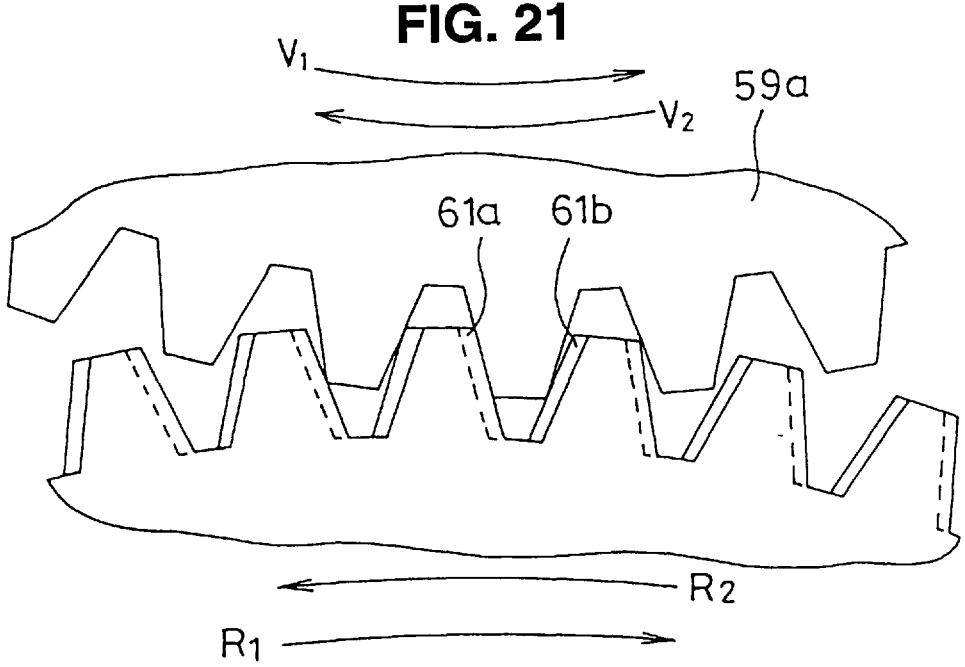
FIG. 21 is a cross-sectional view illustrating a meshing state among the drive gears of the drive-gear mechanism and the transmission gears of the driving-side transmission gear mechanism in the disk unit of the invention.
Figure 37:
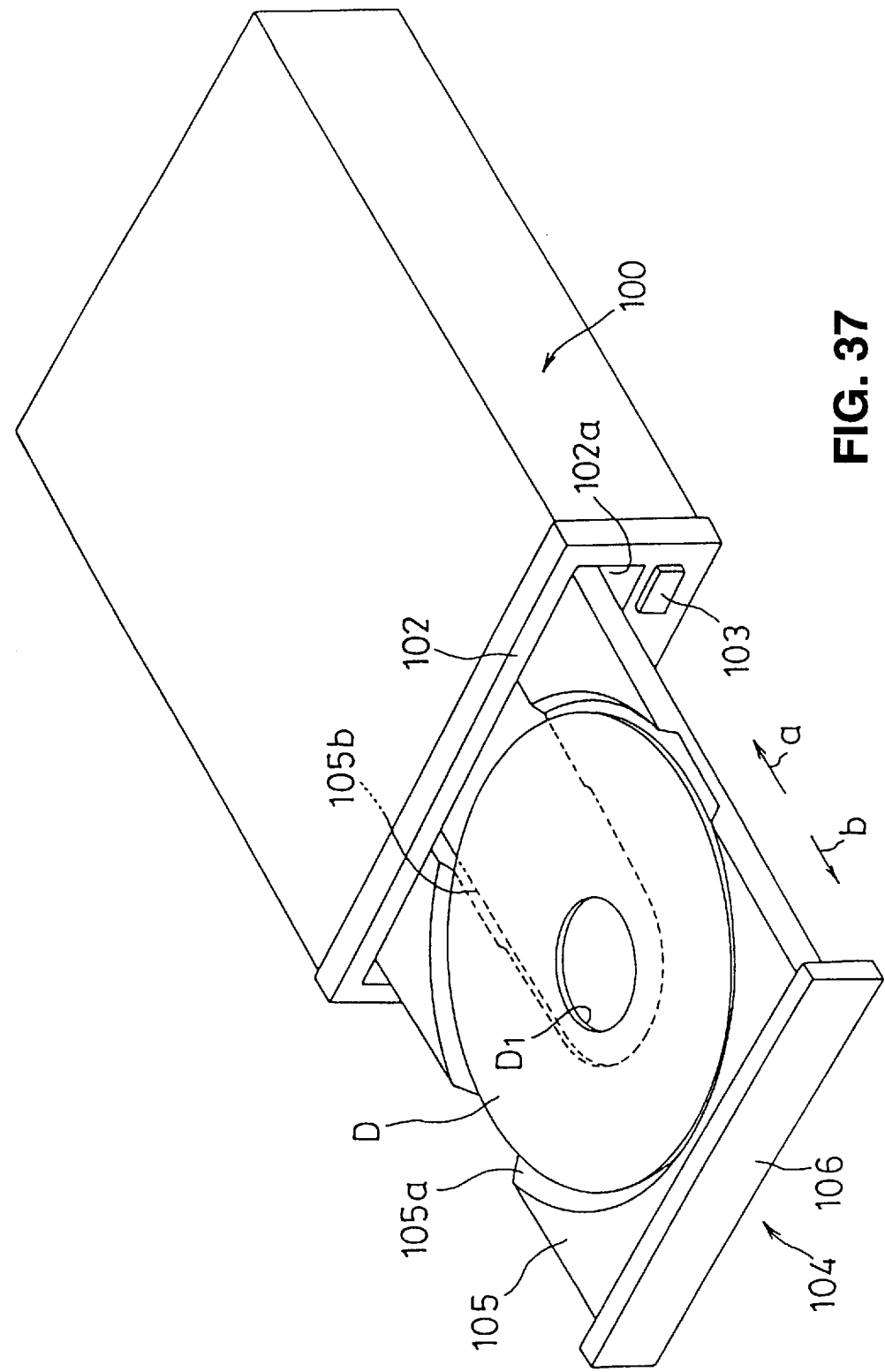
FIG. 37 is a perspective view illustrating a state of completion of ejection of the disk tray in the disk unit of the invention.

During loading of the disk, upon the front plate 106 is lightly pushed in the direction indicated by the arrow a after the optical disk D has been placed onto the concavity 105a of the disk placing plate 105 as shown in FIG. 37, a loading switch (not shown) is switched ON and then a disk-tray driving-force transmission mechanism as set out below is activated, with the result that the disk tray 104 is inserted into the casing 101 as shown in FIG. 21.

Figure 20:
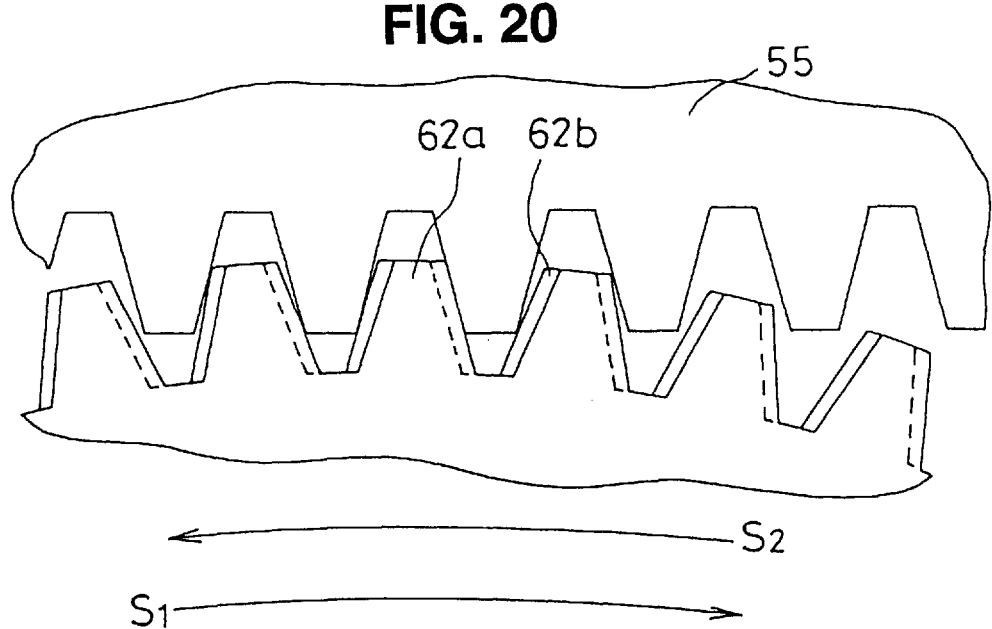
FIG. 20 is a cross-sectional view illustrating a meshing state among the rack and the respective transmission gears of the driven-side transmission gear mechanism in the disk of the invention.

On the other hand, during ejection of the disk, the disk tray 104 located in the casing 101 is ejected out of the casing 101 as shown in FIG. 20, by shifting an eject switch (not shown) to its operative state through application of pushing force to the eject button 140 in the disk loading state, or by shifting the disk-tray driving-force transmission mechanism (as set out below) to its operative state in accordance with an eject signal generated from a host computer (not shown) in the disk loading state.

In the disk loading state shown in FIG. 38, in case of emergency wherein electric power source cannot be switched ON owing to service interruption, failure in electric system or the like, the disk ejecting operation is achieved as follows.

A wire-like emergency eject member 107 is inserted through the emergency eject hole 102b of the front panel 102 in the direction of the arrow a.

Figure 25:
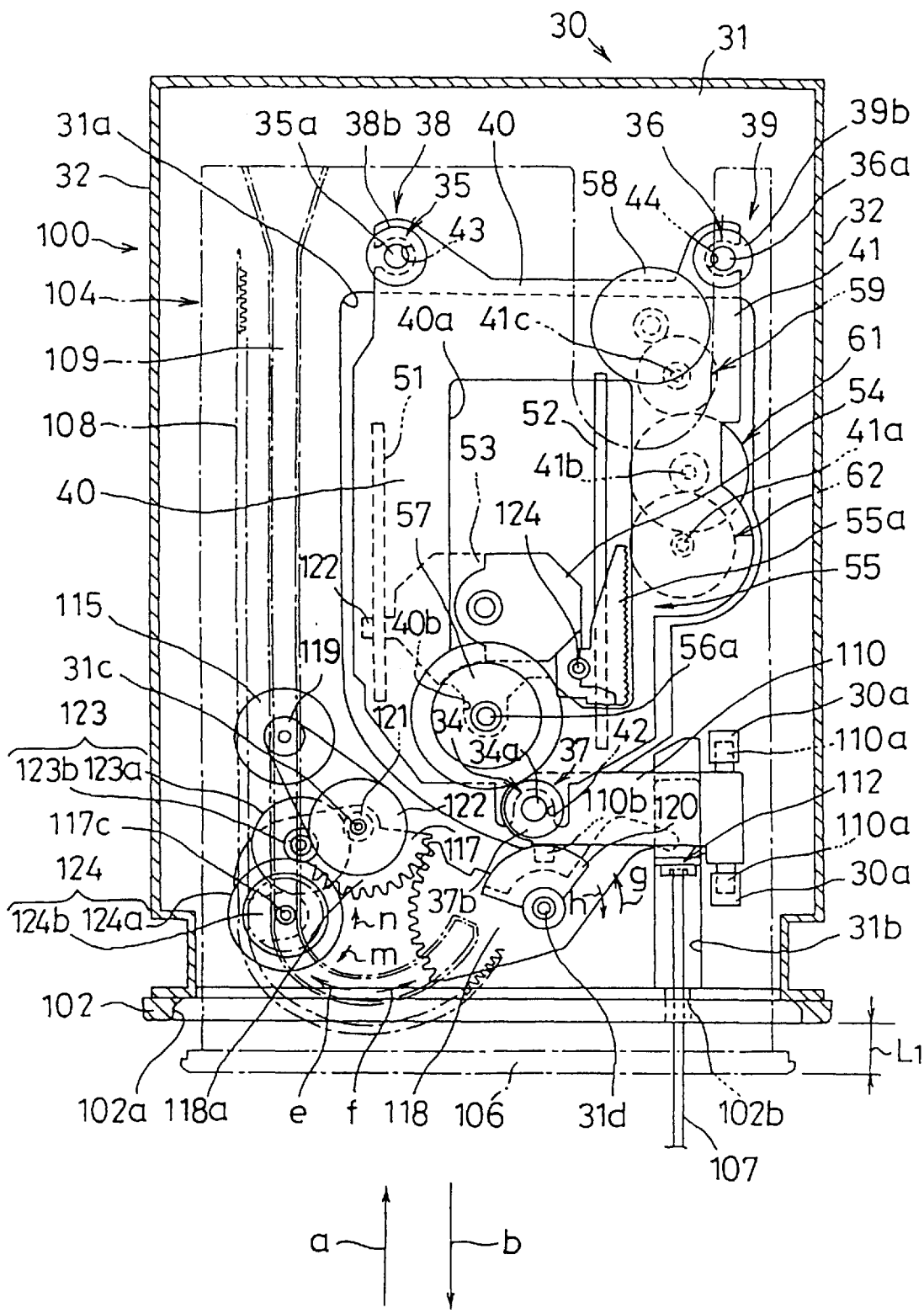
FIG. 25 is a plan view indicating an emergency ejecting operation in the disk unit of the invention.

At this time, as indicated in FIG. 25, the disk tray 104 is pushed out of the casing 101 by a constant distance $L_1$ in the direction of the arrow b by means of the emergency eject mechanism set out below.

Thereafter, the disk tray 104 is pulled out in the direction of the arrow b, by taking the front plate 106 out by handfuls.

Also provided on the bottom surface of the disk placing plate 105 of the disk tray 104 are a substantially J-shaped inside guide groove 108 and a substantially J-shaped outside rack 109 being close to each other and spaced apart from each other by a predetermined distance τ.

The rack 109 is constructed by a straight portion 109a extending in the tray loading direction (the direction of the arrow a) and in the tray eject direction (the direction of the arrow b), a first circular portion 109b connected to the straight portion 109a at the straight-portion end lying in the tray eject direction, and a second circular portion 109c connected to the first circular portion, while the guide groove 108 is constructed by a straight portion 108a extending in the tray loading direction and tray eject direction, a first circular portion 108b connected to the straight portion 108a at the straight-portion end lying in the tray eject direction, and a second circular portion 108c connected to the first circular portion.

The radius $R_2$ of curvature of the center line of the second circular portion 108c of the guide groove 108 is so dimensioned as to be equal to the turning radius of a guide pin (as set out below) which pin is rotatable about the center indicated by $O_2$ in both directions indicated by the arrows e and f. The radius $R_1$ (about the center $O_1$) of curvature of the center line of the first circular portion 108b is set to be smaller than the radius $R_2$ of curvature of the second circular portion.

Reference numeral 30 denotes a synthetic-resin chassis mounted in the casing 101. The chassis is comprised of a base plate 31 having an opening 31a substantially at its center and two opposing right and left side wall plates 32 connecting to the base plate 31.

Two mounting-pins 35 and 36, which extend upwardly and respectively have flanged portions 35a and 36a, are screwed onto the rear section of the base plate 31 of the chassis 30 so that these pins are arranged in parallel with each other by a predetermined interval in the lateral direction of the chassis.

Additionally, the base plate 31 of the chassis 30 is formed with a guide groove 31b provided near by the back of the emergency eject hole 102b and extending in the tray-loading and tray-eject directions.

On the other hand, each side wall plate 32 of the chassis 30 is integrally formed with a guide 33 which extends in the tray-loading and tray-eject directions and has a concave groove 33a engaging the previously-noted projected portion 105c.

A pulley holder 136 is provided among the upper ends of the side wall plates 32. The pulley holder is located above the internal space necessary to insert the disk tray 104 into the casing and has a through opening 136a at the center of the holder.

Reference numeral 110 denotes a synthetic-resin holder driving lever which is provided at the right-hand side of the chassis 30 at the chassis end lying in the tray eject direction in such a manner as to be rotatable in the directions indicated by the arrows c and d.

The holder driving lever 110 is integrally formed with a support pin 110a at one side end thereof and a stepped portion 111 at the other side end thereof. The support pin is supported by means of bearings 30a and projects in the directions indicated by the arrows a and b. The stepped portion is provided to support the front end of a unit holder 40. The stepped portion has a pin mounting hole 111a being threadably engaged with a mounting-pin 34 which pin has a flanged portion 34a and projects in the same direction of the previously-noted mounting-pins 35 and 36 in the upward holder position.

The holder driving lever 110 is integrally formed with a lever operating pin 110b at its unsupported end, so that the lever operating pin projects in the tray eject direction (the direction indicated by the arrow b).

Reference numerals 37 to 39 denote shock-absorbing rubbers serving as insulators. The rubbers are respectively comprised of cylindrical portions 37a to 39a (represented by only the cylindrical portion 37a) opening in their vertical direction and a pair of upper and lower expanded portions 37b to 39b, each pair connecting to the corresponding one of the cylindrical portions 37a to 39a. The rubbers are disposed on the outer peripheries of the respective mounting pins 34 to 36 and press-fitted onto the chassis 30 by means of the flanged portions 34a to 36a.

Reference numeral 40 denotes the unit holder having an opening 40a penetrating in its vertical direction and a cut-out 40b connected to the opening 40a. The unit holder is supported on the chassis 30 by means of the mounting pins 34 to 36. The unit holder is rotatably provided in the directions indicated by the arrows c and d of FIGS. 35 and 36, by means of the holder driving lever 110. The unit holder is integrally formed with a holding plate 41 projecting from its right-hand end.

Formed nearby the center of the front end of the unit holder 40 and at both sides of the rear end of the unit holder are cut-outs 42 to 44, facing the respective cylindrical portions 37a to 39a of the shock-absorbing rubbers 37 to 39.

Reference numerals 51 and 52 denote left and right guide shafts extending in the front and rear directions (the directions indicated by the arrows a and b) of the chassis and arranged in parallel with each other. The guide shafts are fixedly connected to the bottom of the unit holder 40. Of these, the guide shaft 52 is mounted so that a portion of the guide shaft facing the above-noted opening 40a.

Reference numeral 112 denotes a slider-necessary for emergency ejecting operation. The slider is comprised of a horizontal plate 112a and a vertical plate 112b. For instance, these plate are integrally formed of synthetic resin to provide a substantially L-shaped slider. The slider is provided to be slidable in the guide groove 31b in its advancing and retreating directions.

The vertical plate 112a of slider 112 is formed with a concavity 113 facing the tray ejecting side of the panel.

Reference numeral 114 denotes the disk-tray driving-force transmission mechanism necessary for loading and ejecting operations of the tray. The disk-tray driving-force transmission mechanism is comprised of a reduction gear mechanism 116 driven by a drive motor 115, a substantially L-shaped gear base 117, and a boomerang-shaped cam lever 118. The gear base is linked to the reduction gear mechanism 116 and supported on the chassis 31 by means of the support shaft 31c to be rotatable in the directions indicated by the arrows e and f. The gear base has a sectorial gear 117a at its one end. The cam lever is linked to the gear base 117 and supported on the chassis 31 by means of the support shaft 31 d to be rotatable in the directions indicated by the arrows g and h. The cam lever has a sectorial gear 118a which is brought into meshed contact with the sectorial gear 117a.

The gear base of the disk-tray driving-force transmission mechanism 114 is formed of synthetic resin and comprised of a cylindrical boss 117b, a guide pin 117c, and a support pin 117d disposed substantially midway between the cylindrical boss 117 and the guide pin 117c. The cylindrical boss projects upwardly in the vicinity of the sectorial gear 117a. Additionally the support shaft 31c is inserted into the boss. The guide pin 117c is formed at the gear-base end facing apart from the other gear-base end formed with the boss 117b in such a manner to project upwardly and fitted into the above-noted guide groove 108.

The reduction gear mechanism 116 of the disk-tray driving-force transmission mechanism 114 is comprised of a driving pulley 119, a driven pulley 122, a two-stepped intermediate gear 123, and a stepped output gear 124. The driving pulley is fixed onto the output shaft 115a of the drive motor 115. The driven pulley 122 is linked to the driving pulley through a transmission belt 120, and rotatably supported by the support pin 117d, and has an input gear 121. The intermediate gear includes a large-size gear 123a and a small-size gear 123b integrally formed with each other. The large-size gear 123a is linked to the driven pulley 122, and rotatably supported by the support pin 117d, and meshes with the input gear 121. The output gear 124 includes a large-size gear 124a which is linked to the intermediate gear 123 and rotatably supported by the guide pin 117c and meshes with the small-sized gear 123b, and also includes a small-size gear 124b which meshes with the above-noted rack 109.

The input gear 121 of the reduction gear mechanism 116 consists of a sun gear, while each of the output gear 124 and the intermediate gear 123 consists of a planetary gear which is in circular motion about the input gear 121.

The cam lever 118 of the disk-tray driving-force transmission mechanism 114 is integrally formed with a substantially cylindrical boss 118b which boss is provided at the intermediate portion of the lever in such a manner as to project upwards. Additionally the support shaft 31d is inserted into the boss.

The cam lever 118 is integrally formed with a cam 120 and a slider operating-force receiving pin 121a. The cam extends from the boss 118b in the radial direction of the boss and has a substantially Z-shaped concave groove 119 into which the lever operating pin 110b of the holder driving lever 110 is fitted. The slider operating-force receiving pin projects downwards at the lever end opposing the sectorial gear 118a, and is engageable with the tray-loading side surface of the vertical plate 112b of the above-noted slider 112.

The concave groove 119 of the cam lever 118 is comprised of a high-level portion 119a, a low-level portion 119b and a sloped portion 119c interconnecting the high-level portion 119a and the low-level portion 119b. Of these, the low-level portion 119b is dimensioned so that the low-level portion has a comparatively wide size in the circumferential direction of the above-noted boss 118b.

Reference numeral 53 denotes an optical head carriage required for transferring an optical pick-up device 54 in the tray loading direction (the direction indicated by the arrow a) and in the tray eject direction (the direction indicated by the arrow b). The optical head carriage is slidably supported on the guide shafts 51 and 52 through bearings 45 and 41.

The optical head carriage 53 is integrally formed with raised blocks 53b and 53c at its right-hand side so as to support the above-noted bearing 46. The raised blocks are juxtaposed to each other through a connection wall 53a and extend in the tray eject direction and the tray loading direction.

Reference numeral 124 denotes a rack support pin projecting upwards. The rack support pin is press-fitted to a portion which is located at the right-hand side of the optical head carriage in a manner to be slightly apart from the raised blocks 53b and 53c towards the left-hand side guide shaft 51 of the guide shafts 51 and 52.

The upper end of the rack support pin 124 is formed with an annular groove 124a into which a snap ring 125 is detachably fitted so as to mount the rack.

Reference numeral 55 denotes the rack necessary to transmit a driving force produced by the motor. The rack is comprised of a rack plate 55a, a rack mounting plate 55b and a L-shaped connection plate 55c. The rack plate 55a includes at its front surface a rack function portion 55a1 which extends in the tray loading direction (the direction indicated by the arrow a) and in the tray eject direction (the direction indicated by the arrow b). The rack mounting plate is provided at the back of the end of the rack plate 55a which end corresponds to one end in the tray eject direction, so that the rack mounting plate opposes the upward end of the optical head carriage 53. The connection plate 55c is disposed between the rack mounting plate 55b and the rack plate 55a, and formed of a horizontal piece 55c1 and a vertical piece 52c2. The rack is rotatably supported by the rack support pin 124 in directions indicated by the arrows $a_1$ and $a_2$, in a manner so as to cover a portion of the guide shaft 52.

The rack plate 55a is formed with a cut-out 126 at the back of the rack-plate end in the tray eject direction and a projected portion 127 opposing the above-noted connection wall 53a. The cut-out faces a portion of the respective raised blocks 53b and 53c, while the projected portion faces an intermediate section of the cut-out 126. The rack plate is integrally formed with a projected portion 128 at the back of the rack-plate end in the tray-loading direction. The projected portion extends in the direction perpendicular to the above-noted guide shafts 51 and 52 and has a top end surface corresponding to a segment of an outer periphery of a cylinder.

The rack mounting plate 55b is integrally formed with a cylindrical boss 129 at its right-hand side upper end surface, into which boss the rack support pin 124 is inserted.

The connection plate 55c is integrally formed with a L-shaped piece 130 at its end in the tray loading direction. The L-shaped piece is comprised of a horizontal portion 130a projecting in the direction opposite to the rack plate 55a and a vertical portion 130b opposing the reverse of the rack plate 55a via the guide shaft 52.

The vertical portion 130b of the L-shaped piece 130 is integrally formed with an additional projected portion being provided at a position slightly offsetting in the tray eject direction (the direction indicated by the arrow b) from a portion opposing the projected portion 128. The additional projected portion 131 extends in the direction perpendicular to the guide shafts 51 and 52 and has a top end surface corresponding to a segment of an outer periphery of a cylinder.

Reference numeral 56 denotes a spindle motor having a motor shaft 56a which shaft penetrates the cut-out 40b. The spindle motor is fixed on the forward end of the unit holder 40 and close to the left-hand side of the unit holder in such a manner as to project the reverse of the unit holder.

Reference numeral 57 denotes a disk table on which an optical disk is placed. The disk table is fixedly connected onto the upper end of the motor shaft 56a.

Reference numeral 132 denotes a chucking pulley which is capable of pressing the non-recording zone of the optical disk D against the disk table 57. The chucking pulley is loosely fitted into a through hole 136a in such a manner as to be movable in the vertical direction and in the horizontal direction.

The outer periphery of the chucking pulley 132 is integrally formed with a flanged portion 132a opposing a flanged portion 136b of a pulley holder 136. A through hole 132b is formed in the central portion of the chucking pulley 132 in a manner so as to opening in the vertical direction.

Attached to the chucking pulley 132 is a metallic plate 133 made of aluminum for example, which plate is provided to close the opening of the through hole 132b.

Reference numeral 58 denotes a carriage driving motor having a motor gear 58a exposing towards the under of the holder. The carriage driving motor is fixedly connected to the unit holder 40 at the rearward end of the holder and at the right-hand side of a the holder.

Reference numeral 134 denotes a ring provided for detecting a rotational angle of the motor gear 58a.

Reference numeral 59 denotes a drive-gear mechanism having a drive gear 59a which is rotatable about a support shaft 41c through rotation of the motor gear 58a. The drive-gear mechanism is disposed at the reverse side of the holding plate 41.

Reference numeral 60 denotes an intermediate transmission mechanism provided for transmitting a driving force produced by the driving motor 58 to the head carriage 53 through the rack 55. The intermediate transmission mechanism is linked to the drive gear mechanism 59 and has a driving-side transmission mechanism 61 having a transmission gear A and a driven-side transmission mechanism 62 having a transmission gear B, both transmission gears rotating through rotation of the driving gear 59a. The intermediate transmission mechanism is provided at the outside of the right-hand side guide shaft 52 of the guide shafts 51 and 52.

The transmission gear of the driven-side transmission mechanism 62 meshes with the rack 55 and has a first driven-side transmission gear 62a and a second driven-side transmission gear 62b, the respective gears being rotatable independently of each other. This transmission gear B is rotatably supported at the backward end surface of the holding plate 41 by way of the support shaft 41a.

The first driven-side transmission gear 62a of the transmission gear B is formed with a through hole $62A_1$ penetrating its upper and lower surfaces and a projected portion $62A_2$ projecting downwards.

The second driven-side transmission gear 62b of the transmission gear B is formed with a through hole $62B_1$ penetrating its upper and lower surfaces and a frame-like portion $62B_2$ loosely fitted into the projected portion $62A_2$.

Figure 5:
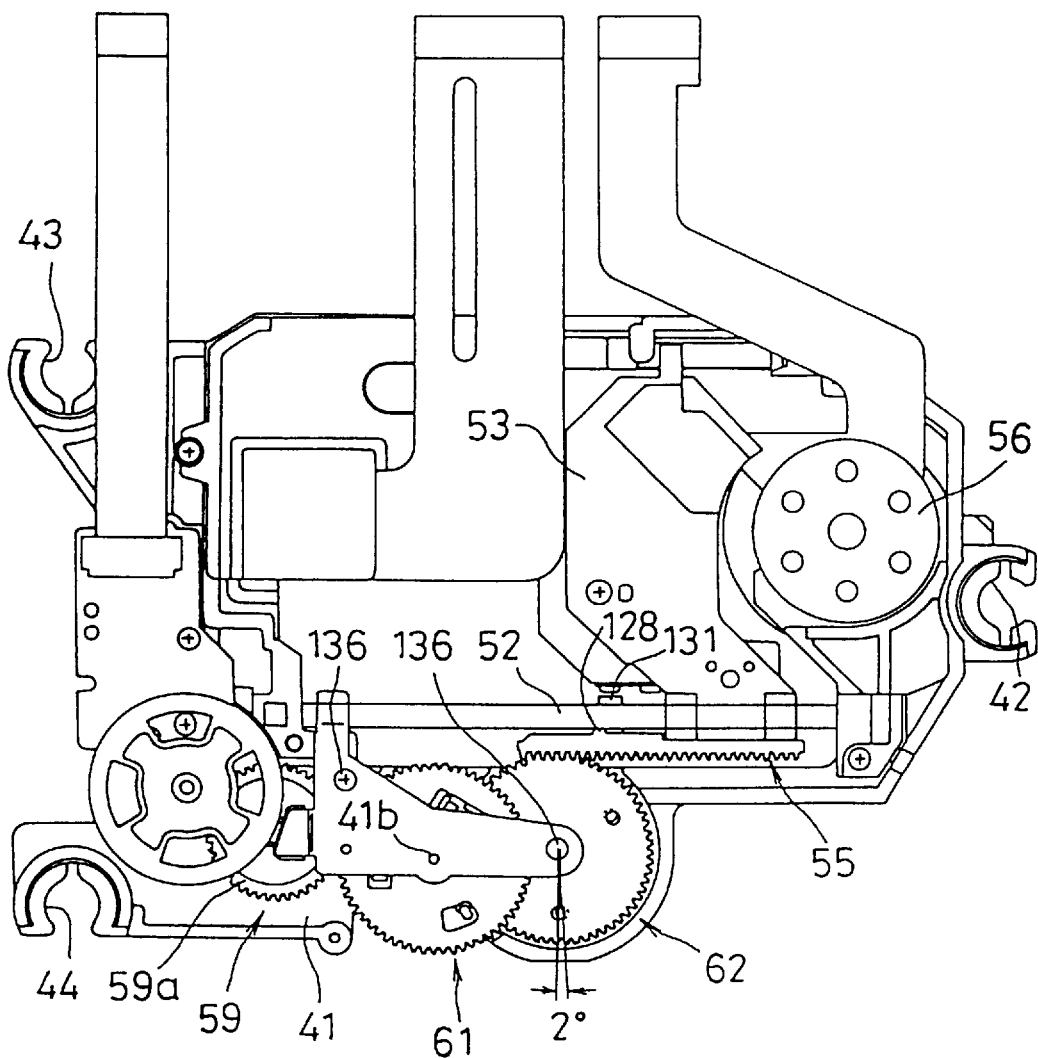
FIG. 5 is a bottom view illustrating the head carriage and the transmission mechanism driving the head carriage of the disk unit according to the invention.
Figure 6:
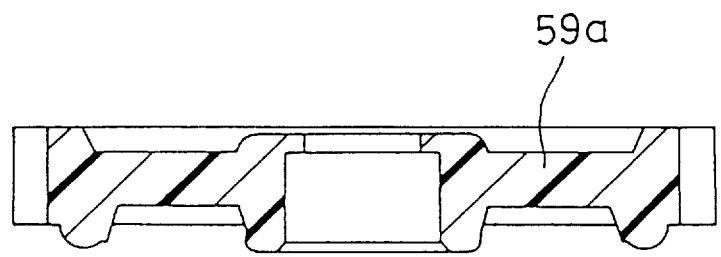
FIG. 6 is a cross-sectional view illustrating a drive gear of a drive-gear mechanism in the disk unit of the invention.
Figure 7:
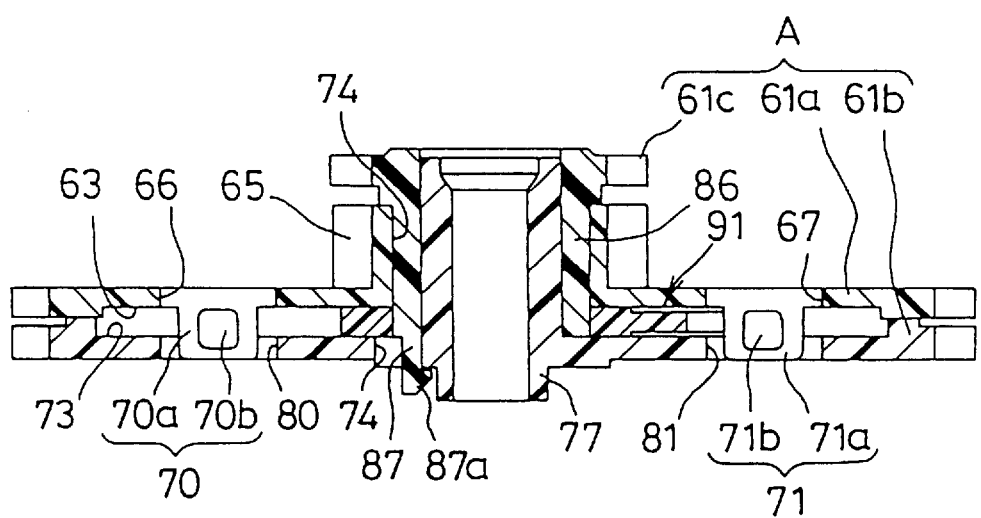
FIG. 7 is a cross-sectional view illustrating an assembling state of gears of a driving-side transmission gear mechanism in the disk unit of the invention.
Figure 8A:
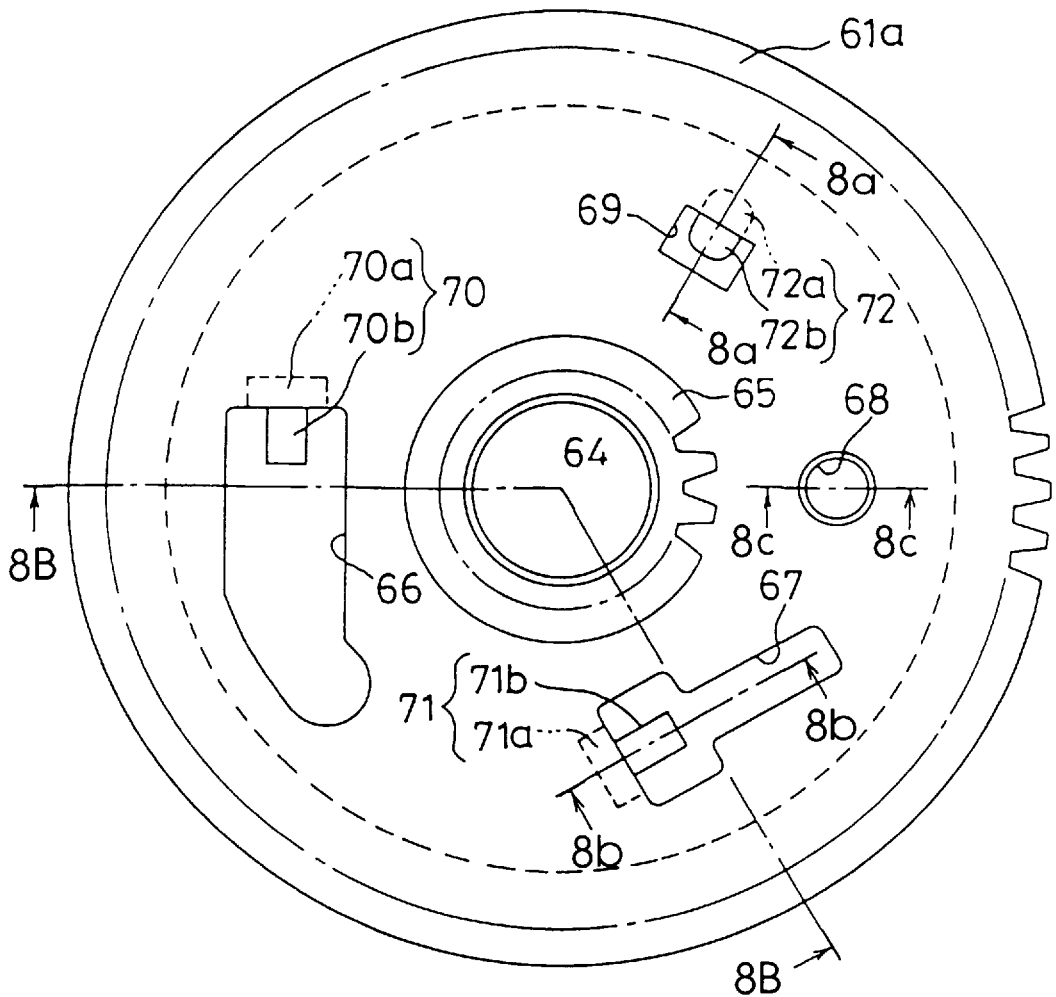
FIGS. 8(A) and 8(B) are a plan view illustrating a first driving-side transmission gear of the driving-side transmission gear mechanism of the disk unit of the invention and a cross-sectional view taken along the line B—B shown in FIG. 8(A), respectively.
Figure 8B:
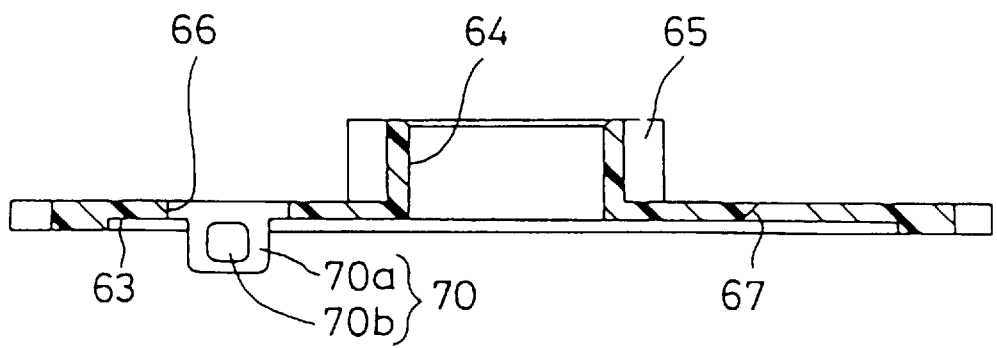
Figure 9A:
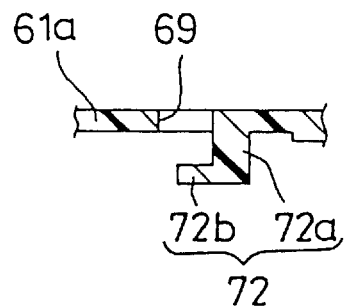
FIGS. 9(A), 9(B) and 9(C) are cross-sectional views respectively taken along the line a—a, along the line b—b, and along the line c—c, each line shown in FIG. 8(A).
Figure 9B:
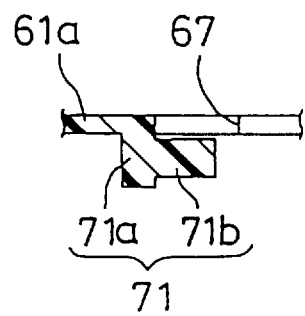
Figure 9C:
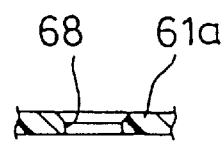
Figure 10A:
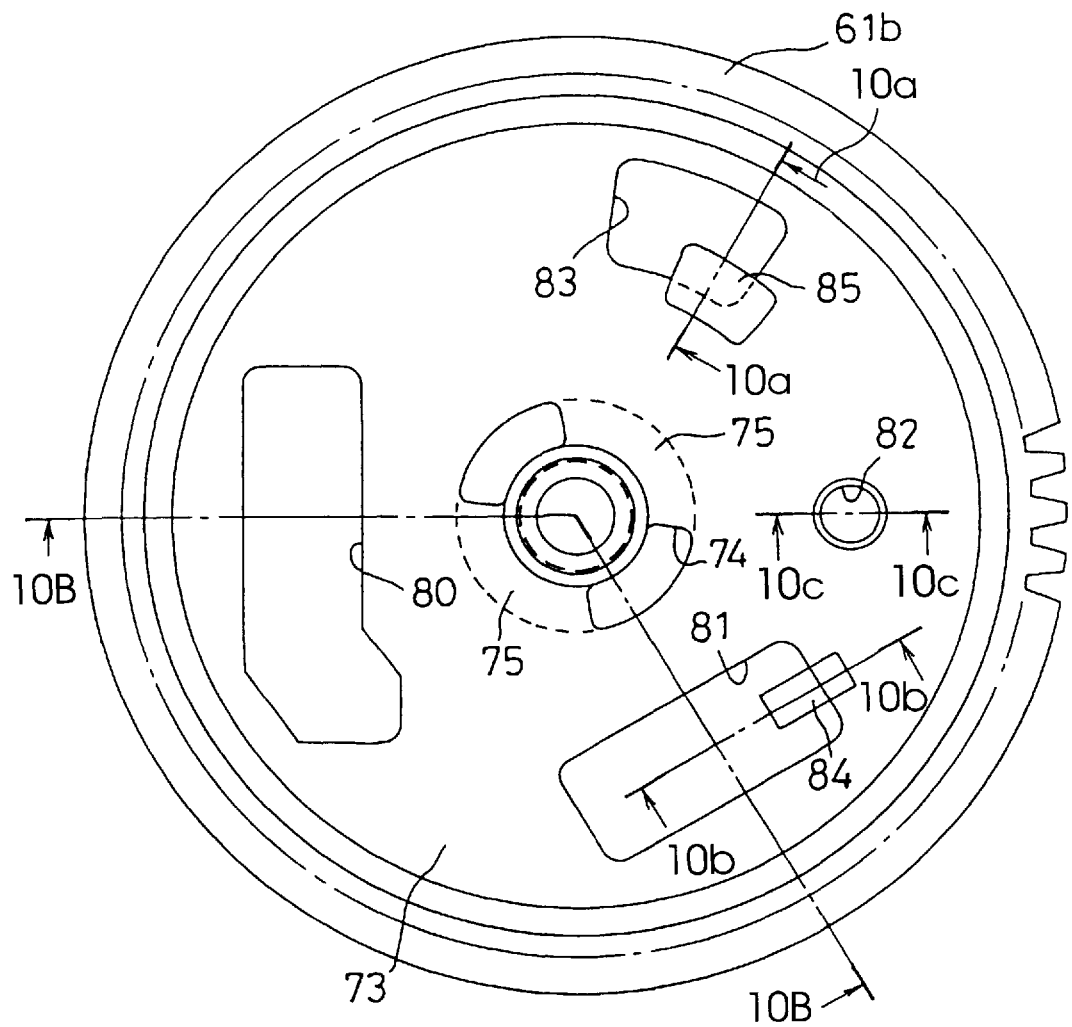
FIGS. 10(A) and 10(B) are a plan view illustrating a second driving-side transmission gear of the driving-side transmission gear mechanism of the disk unit of the invention and a cross-sectional view taken along the line B—B shown in FIG. 10(A), respectively.
Figure 10B:
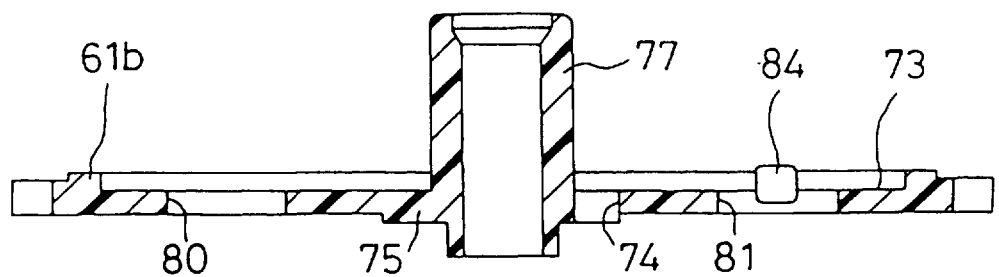
Figure 11A:
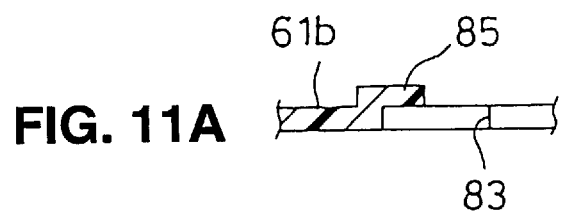
FIGS. 11(A), 11(B) and 11(C) are cross-sectional views respectively taken along the line a—a, along the line b—b, and Ad along the line c—c, each line shown in FIG. 10(A).
Figure 11B:
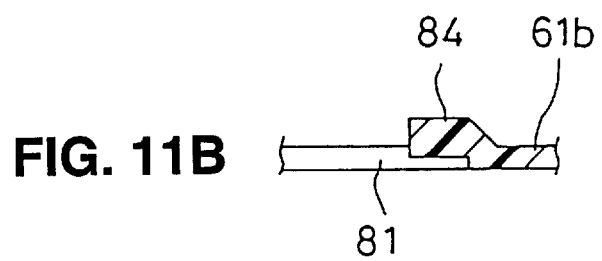
Figure 11C:
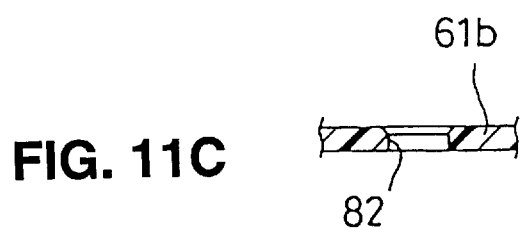
Figure 12A:
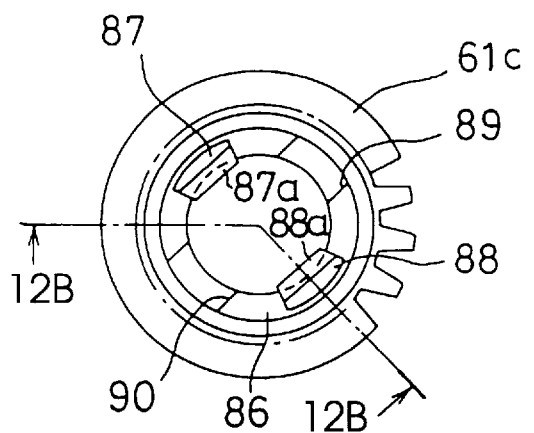
FIGS. 12(A), 12(B) and 12(C) are a plan view illustrating a third driving-side transmission gear of the driving-side transmission gear mechanism of the disk unit of the invention, a cross-sectional view taken along the line B—B shown in FIG. 12(A), and a view in the direction of the arrow C in FIG. 12(B), respectively.
Figure 12B:
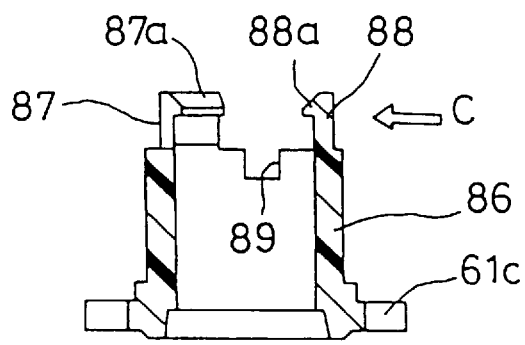
Figure 12C:
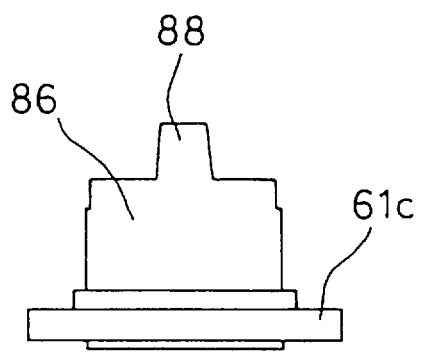
Figure 13A:
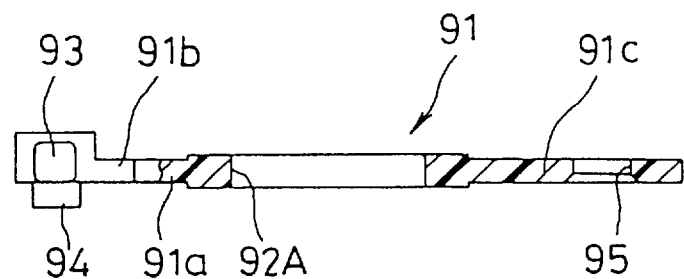
FIGS. 13(A) and 13(B) are a cross-sectional view illustrating a lever of the driving-side transmission gear mechanism of the disk unit of the invention and a plan view illustrating the same, respectively.
Figure 13B:
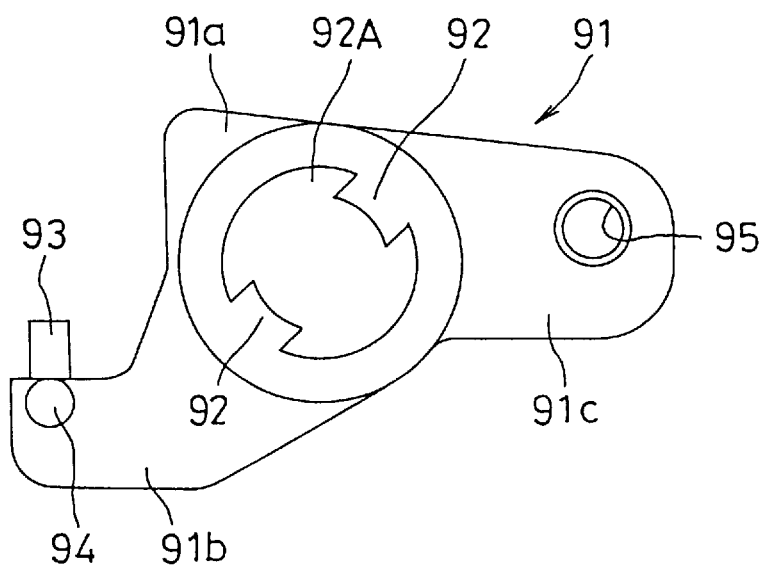
Figure 14A:
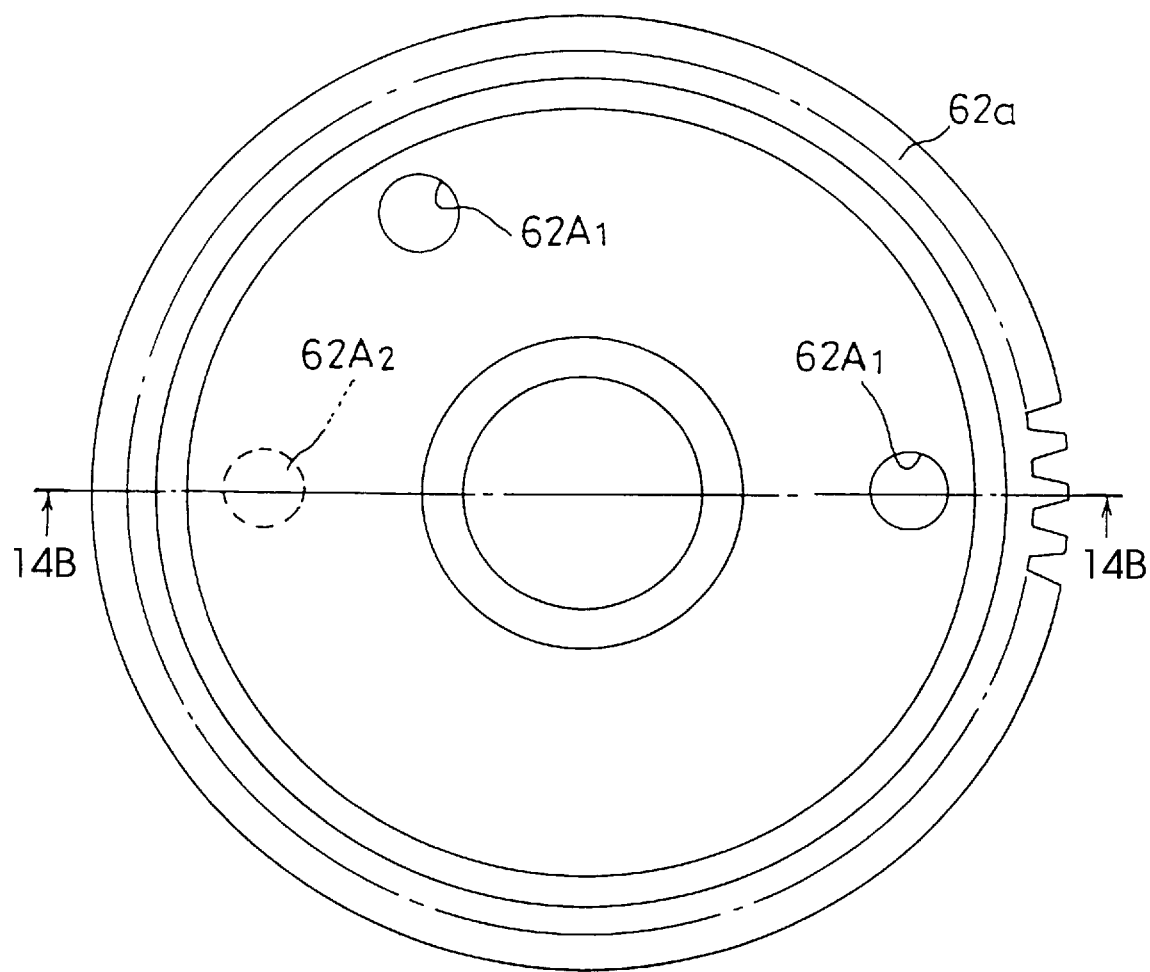
FIGS. 14(A) and 14(B) are a plan view illustrating a first driven-side transmission gear of a driven-side transmission gear mechanism of the disk unit of the invention and a cross-sectional view taken along the line B—B shown in FIG. 14(A), respectively.
Figure 14B:
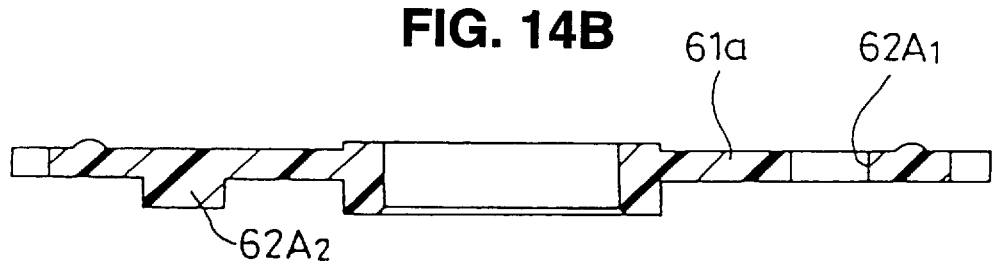
Figure 15A:
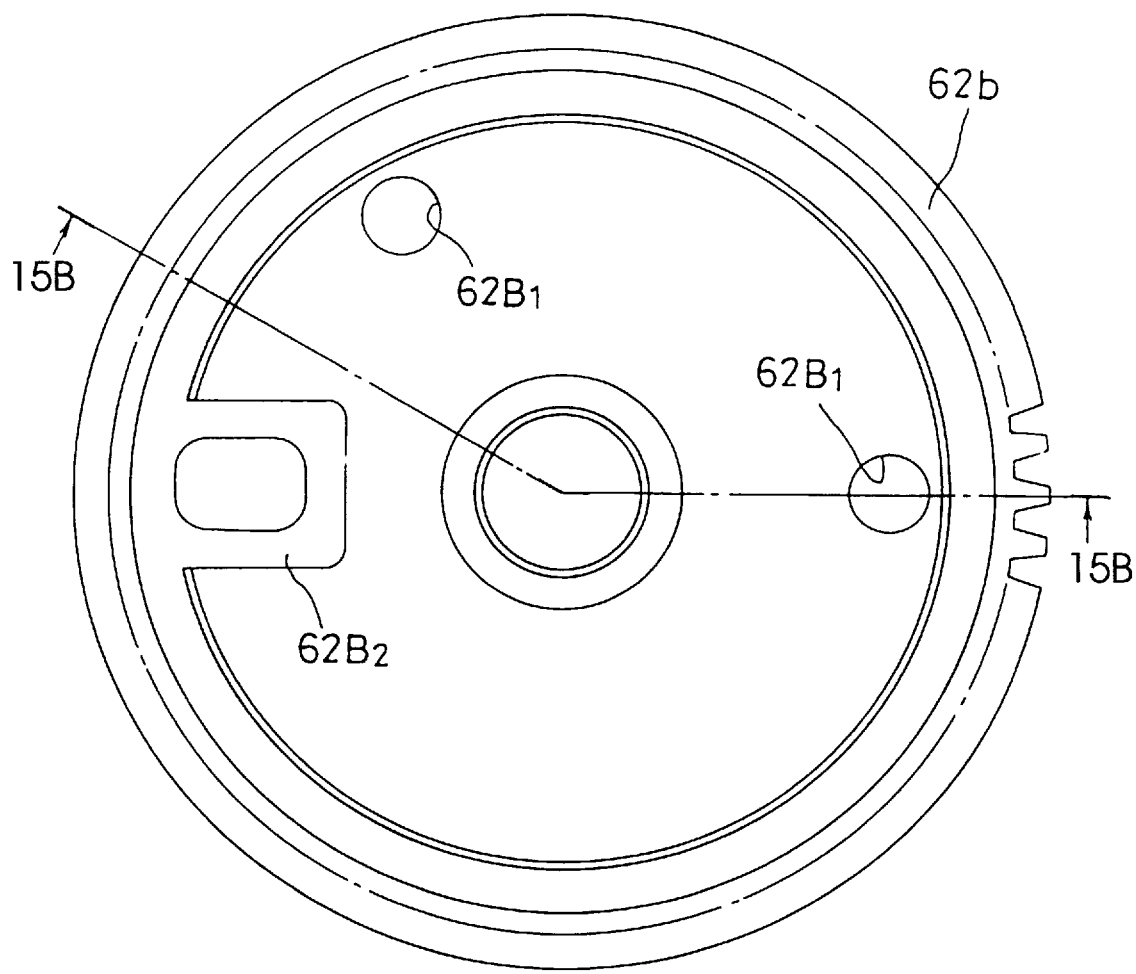
FIGS. 15(A) and 15(B) are a plan view illustrating a second driven-side transmission gear of the driven-side transmission gear mechanism of the disk unit of the invention and a cross-sectional view taken along the line B—B shown in FIG. 15(A), respectively.
Figure 15B:
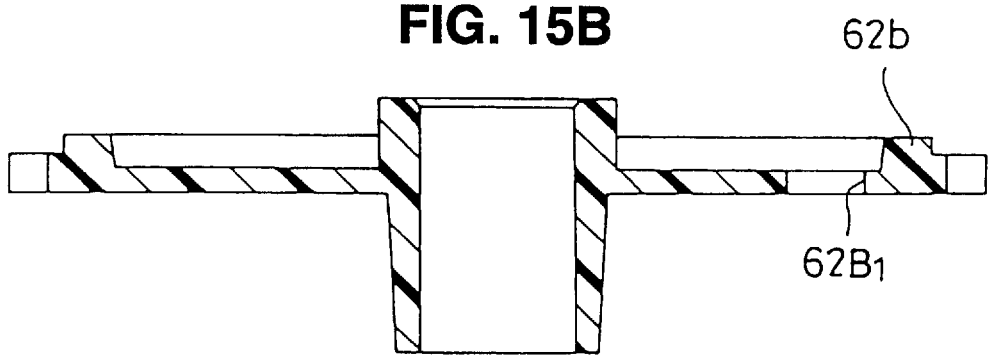
Figure 16A:
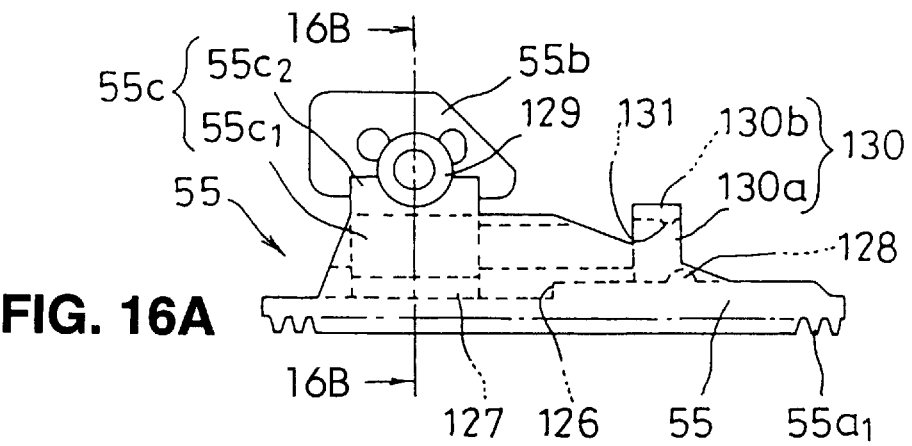
FIGS. 16(A), 16(B) and 16(C) are a plan view illustrating a rack which will be acted upon by a driving force produced by a head-carriage driving motor in the disk unit of the invention, a cross-sectional view taken along the line B—B shown in FIG. 16(A), and a bottom view of the rack, respectively.
Figure 16B:
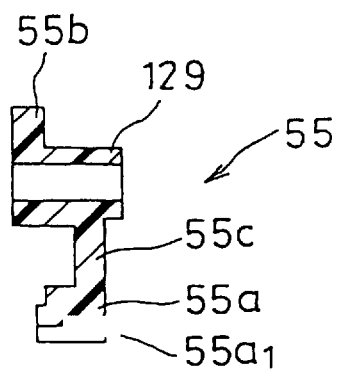
Figure 16C:
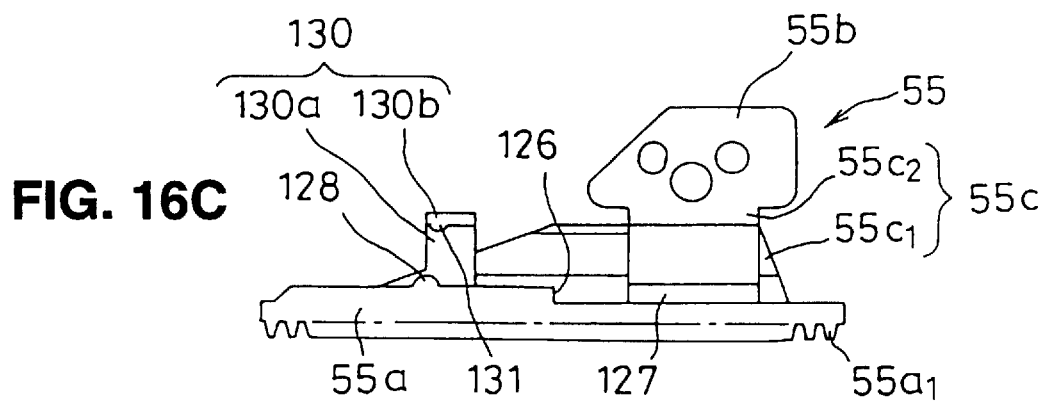
Figure 17A:
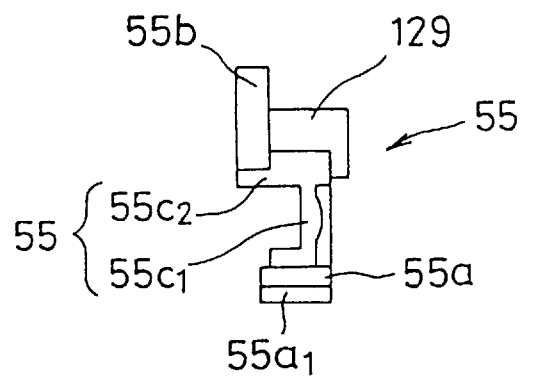
FIGS. 17(A) and 17(B) are a left-hand side view illustrating the rack which will be acted upon by the driving force produced by the head-carriage driving motor in the disk unit of the invention and a right-hand side view illustrating the same, respectively.
Figure 17B:
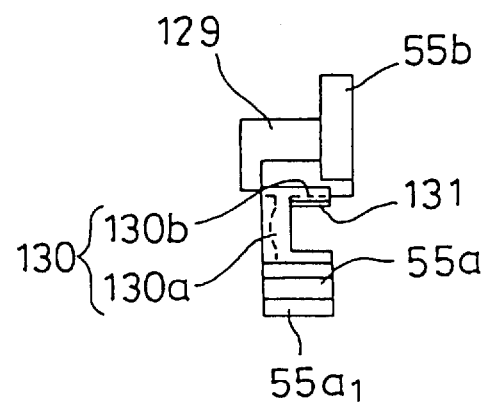
Figure 18:
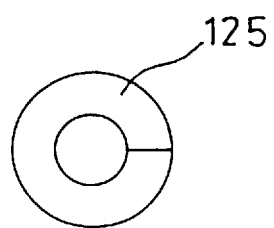
FIG. 18 is a plan view illustrating a snap ring associated with the rack which will be acted upon by the driving force produced by the head-carriage driving motor in the disk unit of the invention.

In the second driven-side transmission gear 62b and the first driven-side transmission gear 62a, when the first and second driven-side transmission gears 62a and 62b are assembled to each other such that the projected portion $62A_2$ is loosely fitted into the frame-like portion $62B_2$, as shown in FIG. 5, the respective transmission gears are designed to be rotatable in their circumferential direction by a maximum of 2 degree in a state wherein the other peripheral gears are not meshed with them. Finally, in case that the peripheral gears are assembled with them, the respective transmission gears are designed to be rotatable by a maximum of 0.4 degree.

The through hole $62B_1$ and the through hole $62A_1$ are so designed to be through holes required for phase matching of gears during assembly. With the driven-side transmission mechanism 62 assembled, these through holes are located on the same plane and at the same circumference of a circle.

On the other hand, the transmission gear of the driving-side transmission mechanism 61 is comprised of a first driving-side transmission gear 61a which meshes with the drive gear 59a, a second driving-side transmission gear 61b which is linked to the first driving-side transmission gear 61a through a first backlash eliminating mechanism set out below and meshes with the drive gear 59a, and a third driving-side transmission gear 61c with a lever which gear is rotatably attached to the second driving-side transmission gear 61b and linked to the first driving-side transmission gear 61a through a second backlash eliminating mechanism set out below and meshes with the first driven-side transmission gear 62a. The transmission gear A is rotatably supported at the backward end surface of the holding plate 41 by way of the -support shaft 41a.

The driving-side transmission gear 61a of the transmission gear A includes a circular concavity 63 at its bottom end surface and also includes a center hole 64 opening from the inside of the circular concavity 63 to the outside. Integrally formed at the outer periphery of the upper opening of the center hole 64, is a small-size gear 65 extending upwardly and meshing with the above-noted second driven-side transmission gear 62b.

Additionally, the first driving-side transmission gear 61a is formed with two through windows 66 and 67 and two through holes 68 and 69, respectively opening from the inside of the circular concavity 63 to the outside, in the same manner as the above-noted center hole 64.

These through windows 66 and 67 include a substantially boomerang-shaped through window and a substantially T-shaped through window, respectively. The peripheral edge of the reverse side of the boomerang-shaped through window is integrally formed with a spring hanger 70 consisting of a vertical portion 70a projecting downwards and a horizontal portion 70b connected to the vertical portion 70a in such a manner as to partly close a portion of the through window, while the peripheral edge of the reverse side of the T-shaped through window is integrally formed with a spring hanger 71 consisting of a vertical portion 71a projecting downwards and a horizontal portion 71b connected to the vertical portion 71a in such a manner as to partly close a portion of the through window.

On the other hand, the through holes 68 and 69 include an essentially circular through hole and an essentially rectangular through hole, respectively. The peripheral edge of the reverse side of the through hole 69 is integrally formed with an engaging portion 72 consisting of a vertical portion 72a extending downwards and a horizontal portion 72b connected to the vertical portion 72a.

Hereinbelow explained is the second driving-side transmission gear 61b. The second driving-side transmission gear 61b is integrally formed with a circular concavity 73 opening towards the outside of the gear and through holes 74b, opening from the inside of the circular concavity 73 to the outside and substantially sectorial two connection portions 75 and 76 which extend within the opening of center hole 74 and is circumferentially spaced apart from each other at regular intervals.

Also, the second driving-side transmission gear 61b is integrally formed with a cylindrical boss 77 among the connection portions 75 and 76 so that the boss penetrates both the above-noted center holes 64 and 74. The lower end of the boss, circumferentially offsetting from the respective connection portions 75 and 76 by 90 degree, is formed with two cut-outs, so as to provide stepped portions 78 and 79.

Furthermore, the second driving-side transmission gear 61b is formed with two through windows 80 and 81 and two through holes 82 and 83, respectively opening from the inside of the circular concavity 73 to the outside in the same manner as the above-noted center hole 74.

The through windows 80 and 81 include a substantially boomerang-shaped window into which a portion of the above-noted spring hanger 70 is projected and a substantially rectangular window into which a portion of the above-noted spring hanger 71 is projected, respectively. The peripheral edge outside of the through hole 81 of these through holes 80 and 81 is integrally formed with a spring hanger extending upwards in such a manner as to partly close a portion of the through window.

On the other hand, the through holes 82 and 83 include an essentially circular through hole and a substantially trapezoidal through hole, respectively. The corner of the peripheral edge of the through hole 83 is integrally formed with an engaging portion 85 extending circumferentially and corresponding to the horizontal portion 72b of the above-noted engaging portion 72.

The back surface of the third driving-side transmission gear 61c is integrally formed with a downwardly projecting cylindrical body 86 to which the above-noted boss is fitted. The lower end of the cylindrical body 86 is integrally formed with two resilient portions 87 and 88 having respective nailed portions, one being a nailed portion 87a engaging with the above-noted stepped portion 78 and loosely fitted into the through hole 74a of the second driving-side transmission gear 61b, and the other being a nailed portion 88a engaging with the above-noted stepped portion 79 and loosely fitted into the through hole 74b of the second driving-side transmission gear.

The cylindrical body 86 of the third driving-side transmission gear 61c is formed with a downwardly opening cutouts 89 and 90 circumferentially arranged at regular intervals so that the cut-outs are adjacent to both the resilient portions 87 and 88.

Additionally, a lever 91 is attached to the third driving-side transmission gear 61c. The lever consists of an annular base portion 91a opposing the above-noted center hole 64 and the peripheral edge of the under side of the through holes 74a and 74b, and two arm portions 91b and 91c, both connected to the outer peripheral edge of the base portion 91a and respectively opposing the bottom surfaces of the circular concavities 63 and 73.

The base portion 91a of the lever 91 is formed with a through hole 92A opening from the inside of the lever to the outside and inserted therethrough by both the resilient portions 87 and 88, and projected portions 92 projected into the through hole 92A and exposing within the opening plane of the center hole 64 and fitting to the cut-outs 89 and 90.

Of these arm portions 91b and 91c of the lever 91, one arm portion 91b is integrally formed with a spring hanger 93 corresponding to the spring hanger 70 and a stopper 94 projected into the through window 66, while the other arm portion 91c is formed with a through hole 95 being cooperative with the through hole 68 of the first driving-side transmission gear 61a and the through hole 82 of the second driving-side transmission gear 61b for the purpose of phase matching of toothed portions.

The through hole 95 and the through holes 68 and 82 (all having a bore of 1.5 mm) are designed to be through holes utilized for phase matching among toothed portions during assembly of the mechanisms. Under a condition of completion of assembling the driving-side transmission gear 61, these through holes are all located at the identical area on their circumference of the circle.

Reference numeral 135 denotes a thrust receiving plate having an engaging portion 135a engaging the guide shaft 52. The thrust receiving plate is fixedly secured to the holding plate 41 by means of screws 136. The thrust receiving plate is provided to prevent the drive gear 59a, the first, second and third driving-side transmission gears 61a to 61c, the lever 91, the first and second driven-side transmission gears 62a and 62b from falling out.

The thrust receiving plate 135 is formed with a positioning hole 135b to which the top end of the support shaft 41b is fitted, a screw-threaded holes 135c and 135d into each of which a screw is threadably engaged.

Hereinbelow explained is a meshing condition between the respective gears.

Reference numeral 96 denotes a first coil spring serving as a first backlash eliminating means. The first coil spring is disposed between both the spring hangers 71 and 84 in its permanently compressed state. Thus, as shown in FIG. 1, each of the spring hangers 71 and 84 is spring-loaded by way of reaction force of the first coil spring 96.

That is to say, as shown in FIG. 21, by the spring-bias of the first coil spring 96, a biasing force is applied to the first driving-side transmission gear 61a so that the first driving-side transmission gear rotates in the direction indicated by the arrow $R_1$, while a biasing force is applied to the second driving-side transmission gear 61b so that the second driving-side transmission gear rotates in the direction indicated by the arrow $R_2$.

For the reasons set forth above, the ridge of the drive gear 59a is kept in circumferentially meshed engagement with the ridge of the first driving-side transmission gear 61a at one side thereof and with the ridge of the second driving-side transmission gear 61b at the other side thereof.

Figure 2:
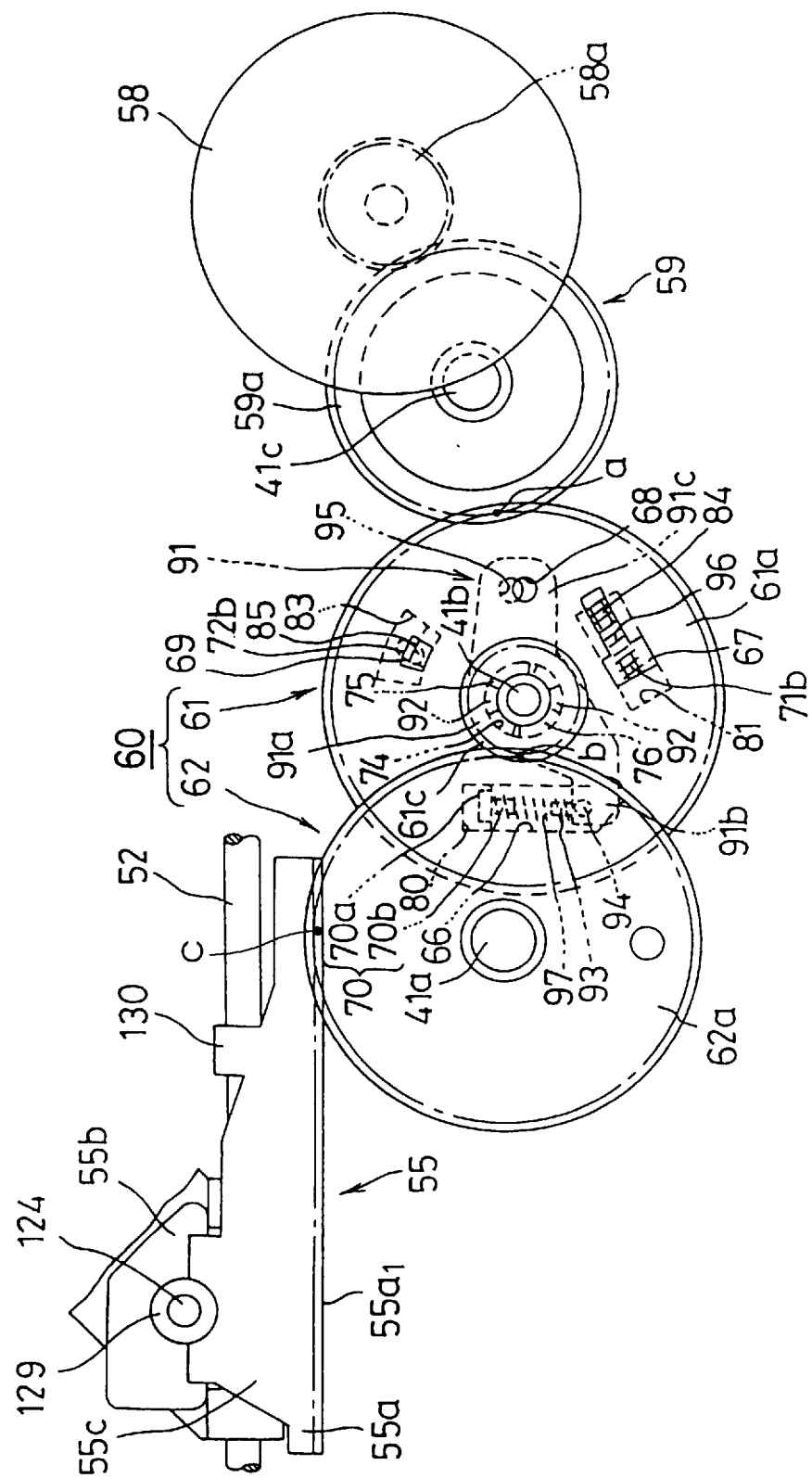
FIG. 2 is a plan view illustrating the transmission mechanism driving the head carriage incorporated in the disk unit according to the invention.
Figure 3:
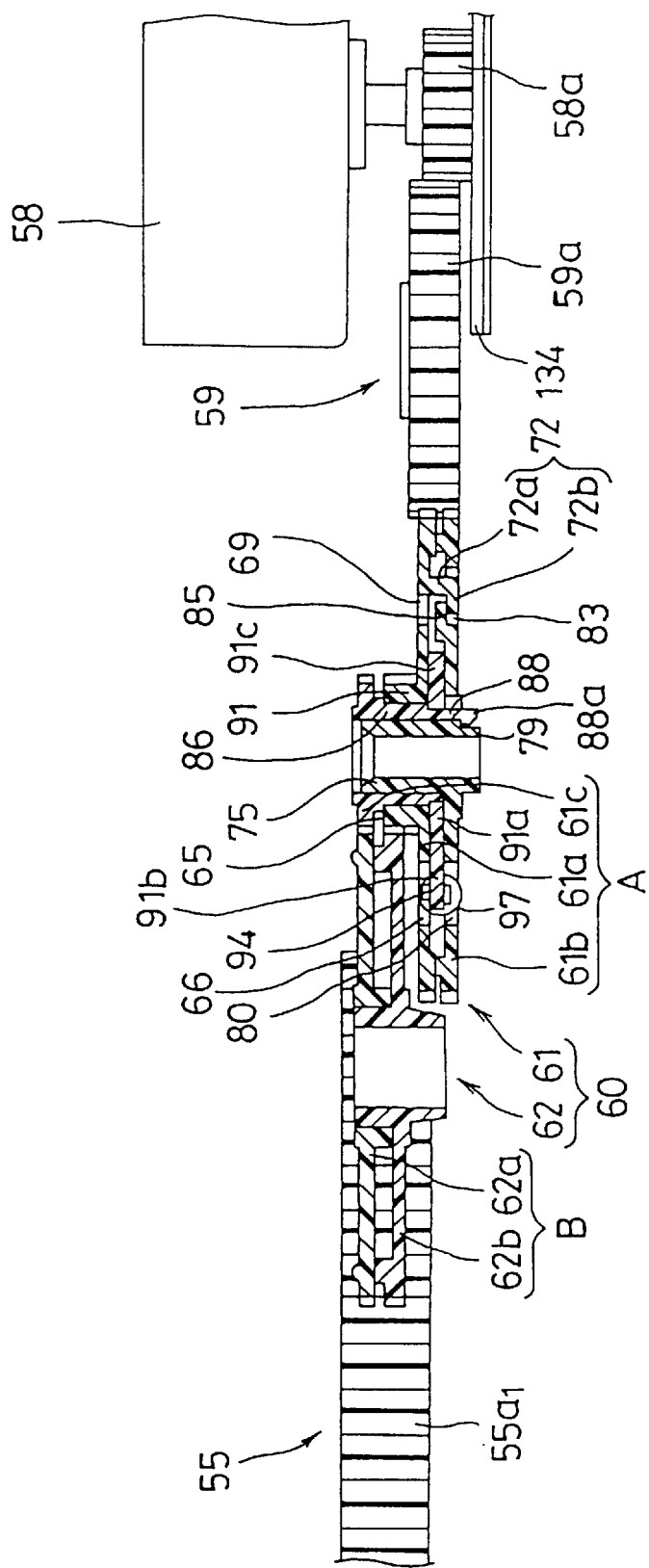
FIG. 3 is a cross-sectional view illustrating the transmission mechanism driving the head carriage of the disk unit according to the invention.
Figure 4:
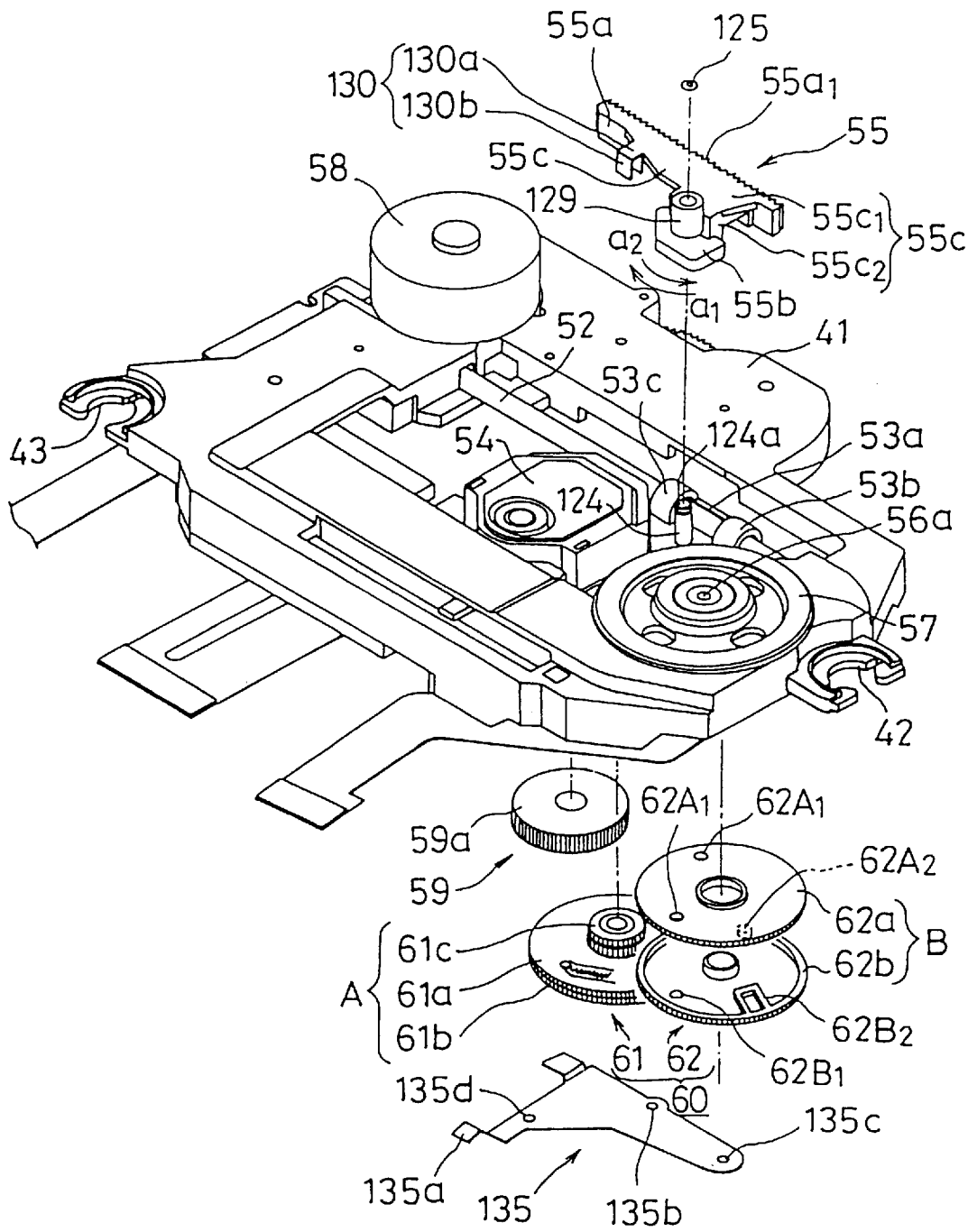
FIG. 4 is an exploded perspective view illustrating the head carriage and the transmission mechanism driving the head carriage of the disk unit according to the invention.
Figure 22A:
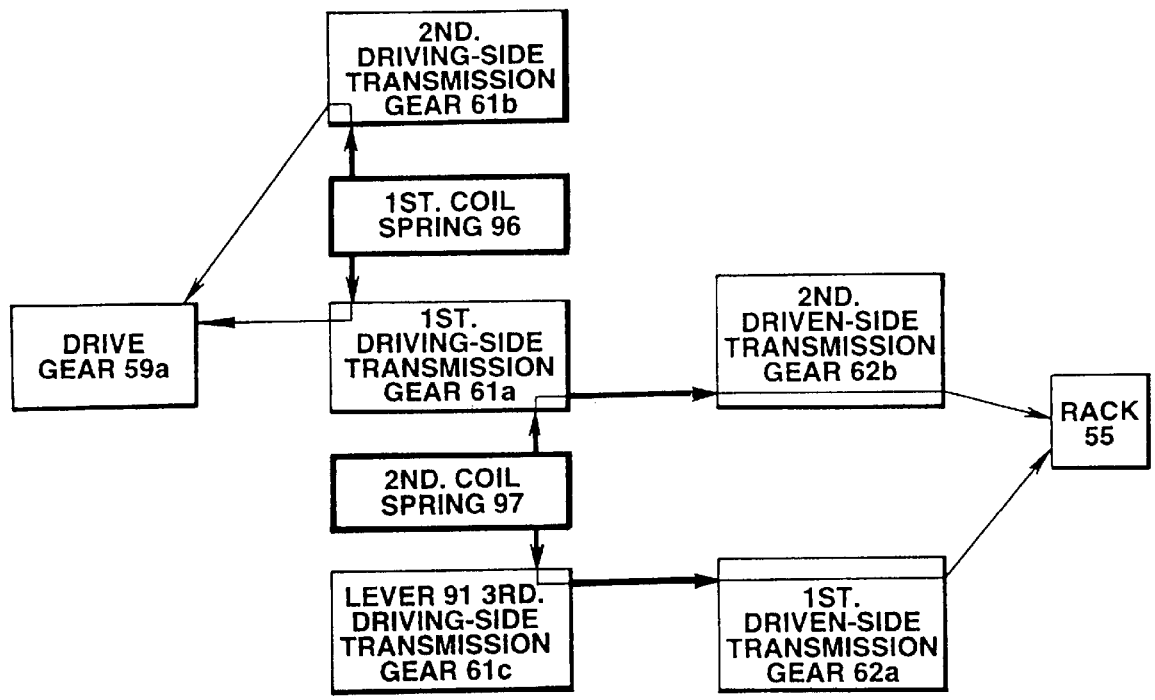
FIGS. 22(a) and 22(b) are explanatory views, respectively indicating a state of transmission of the driving force produced by the head-carriage driving motor and a state of application of spring-bias in the disk unit of the invention.

The spring-bias of the first coil spring 96 is transmitted to both the first driving-side transmission gear 61a and the second driving-side transmission gear 61b as shown in FIG. 22(a), with the result that the first driving-side transmission gear 61a rotates clockwise to mesh with the drive gear 59a as shown in FIG. 2, while the second driving-side transmission gear 61b rotates counterclockwise to mesh with the drive gear 59a. In this manner, the respective gears are kept in meshed engagement with each other.

On the other hand, reference numeral 97 denotes a second coil spring serving as a second backlash eliminating means. The second coil spring is disposed between the spring hangers 70 and 93 in its permanently compressed state. As shown in FIG. 1, each of the spring hangers is spring-loaded by way of reaction force of the second coil spring 97.

Referring now to FIG. 1, by the spring-bias of the second coil spring 97, a biasing force is applied to the lever 91 having one spring hanger 93 so that the lever rotates in the direction indicated by the arrow T. Thus, a biasing force is applied to the third driving-side transmission gear 61c fixedly fitted to the lever 91, so that the third driving-side transmission gear rotates in the direction indicated by the arrow T.

As a result of the biasing force produced by the second coil spring 97 and acting on the third driving-side transmission gear 61c in the direction indicated by the arrow T, the biasing force is applied to the first driven-side transmission gear 62a meshing with the third driving-side transmission gear 61c so that the driven-side transmission gear rotate in the direction indicated by the arrow $S_1$.

In the same manner, as seen in FIG. 1, the spring-bias of the second coil spring 97 acts to rotate the first driving-side transmission gear 61a with the other spring hanger 70 in the direction indicated by the arrow $R_1$, and thus the biasing force is applied to the small-size gear 65 which is rotatable together with the first driving-side transmission gear 61a, with the result that the small-size gear rotates in the direction indicated by the arrow $R_1$.

As a result of the biasing force produced by the second coil spring 97 and acting on the small-size gear 65 in the direction indicated by the arrow $R_1$, the biasing force is applied to the second driven-side transmission gear 62b so that the second driven-side transmission gear rotates in the direction indicated by the arrow $S_2$.

That is to say, as shown in FIG. 20, by the spring-bias of the second coil spring 97, a biasing force is applied to the first driven-side transmission gear 62a so that the first driven-side transmission gear rotates in the direction indicated by the arrow $S_1$, while a biasing force is applied to the second driven-side transmission gear 62b so that the second driven-side transmission gear rotates in the direction indicated by the arrow $S_2$.

For the reasons set out above, the ridge of the rack 55 is kept in circumferentially meshed engagement with the ridge of the first driven-side transmission gear 62a at one side thereof and with the ridge of the second driven-side transmission gear 62b at the other side thereof.

Additionally, owing to the spring-bias of the second coil spring 97, as seen in FIG. 22(a), a biasing force is applied, on the one side, to the first driven-side transmission gear 62a through the lever 91 and the second driving-side transmission gear 61c, and a biasing force is applied, on the other hand, to the second driven-side transmission gear 62b through the first driving-side transmission gear 61a.

As a consequence, the first driven-side transmission gear 62a rotates clockwise to mesh with the rack 55 as seen in FIG. 2, while second driven-side transmission gear 62b rotates counterclockwise to mesh with the drive gear 59a as seen in FIG. 2. In this manner, the respective gears are kept in meshed engagement with each other.

As appreciated from the above, the first and second coil springs 96 and 97 are cooperative to each other so that the first and second driving-side transmission gears 61a and 61b are kept in meshed engagement with the drive gear 59a, while rotating in the two opposing circumferential directions with respect to the drive gear. Consequently, backlash free engagement is permanently maintained after assembling the gears.

Hereinbelow explained in detail is a process of transmission of driving force from the driving motor 58 to the rack 55.

First of all, as seen in FIG. 1, explained is such a case where the driving motor 58 rotates in its positive direction.

Rotation of the driving motor 58 to the positive direction results in rotation of the motor gear 58a in the direction indicated by the arrow $U_1$, and thereby results in rotation of the drive gear 59a in the direction indicated by the arrow $V_1$.

Referring now to FIG. 21, since the driving force acting on the drive wheel 59a in the direction indicated by the arrow $V_1$ transmitted to second driving-side transmission gear 61b which gear meshes with the drive gear 59a by rotating the second driving-side transmission gear in the direction indicated by the arrow $R_2$ by way of the biasing force constantly acting in the direction of the arrow $R_2$, the second driving-side transmission gear 61b rotates in the direction indicated by the arrow r2 illustrated in FIG. 1.

When the second driving-side transmission gear 61b rotates in the direction indicated by the arrow r2, the rotational force acting in the direction of the arrow r2 is transmitted to the first driving-side transmission gear 61a against the spring bias of the first coil spring 96, with the result that the first driving-side transmission gear 61a rotates in the same rotational direction as the second driving-side transmission gear 61b, i.e., in the direction indicated by the arrow $R_1$.

The first coil spring 96 is so designed to have a strong compression force enough to counter against the driving force produced by rotation of the second driving-side transmission gear 61b. In the event that the driving force is transmitted from the second driving-side transmission gear 61b through the first coil spring 96 to the first driving-side transmission gear 61a, the first coil spring 96 cannot be compressed more than the precompressed state of the first coil spring after assembly.

In accordance with rotation of the first driving-side transmission gear 61a to which the driving force is applied in the direction of $R_1$, the small-size gear 65 which gear rotates together with the first driving-side transmission gear 61a rotates in the same direction as the first driving-side transmission gear, and thus the driving force is transmitted to the second driven-side transmission gear 62b meshing with the small-size gear 65, thereby resulting in rotation of the second driven-side transmission gear 62b in the direction indicated by the arrow $S_2$.

Referring to FIG. 20, since the biasing force acting in the direction of the arrow $S_2$ is applied constantly to the second driven-side transmission gear 62b. as set forth above, the second driven-side transmission gear meshes with the rack 55, while rotating in the direction of the arrow $S_2$.

That is to say, when the driving force acting in the direction of the arrow $S_2$ is applied to the second driven-side transmission gear 62b by the driving force produced by rotation of the driving motor 58 in its positive direction, this driving force is transmitted directly to the rack 55.

Thus, in case that the driving force produced by rotation of the driving motor 58 to the positive direction is transmitted to a the rack 55, there is no occurrence of backlash owing to an error of meshed engagement of toothed portions of the gears.

Returning to FIG. 1, explained is such a case where the driving motor 58 rotates in its negative direction.

Rotation of the driving motor 58 to the negative direction results in rotation of the motor gear 58a in the direction indicated by the arrow $U_2$, and thereby results in rotation of the drive gear 59a in the direction indicated by the arrow $V_2$.

Returning to FIG. 21, since the driving force acting on the drive wheel 59a in the direction indicated by the arrow $V_2$ transmitted to first driving-side transmission gear 61a which gear meshes with the drive gear 59a by rotating the first driving-side transmission gear in the direction indicated by the arrow $R_1$ by way of the biasing force constantly acting in the direction of the arrow $R_1$, the first driving-side transmission gear 61a rotates in the direction indicated by the arrow r1 illustrated in FIG. 1.

When the first driving-side transmission gear 61a rotates in the direction indicated by the arrow r1, the rotational force acting in the direction of the arrow r1 is transmitted to the lever 91 against the spring bias of the second coil spring 97.

In the same manner as the first coil spring 96, the second coil spring 97 is also designed to have a strong compression force enough to counter against the driving force produced by rotation of the first driving-side transmission gear 61a. In the event that the driving force is transmitted from the first driving-side transmission gear 61a through the second coil spring 97 to the lever 91, the second coil spring 97 cannot be compressed more than the pre-compressed state of the second coil spring after assembly.

The driving force applied to the lever 91 results in rotation of the lever 91 in the direction indicated by the arrow T as seen in FIG. 1. Then, the third driving-side transmission gear 61c firmly fitted to the lever 91 rotates in the direction of the arrow T.

Via the third driving-side transmission gear, the driving force is transmitted to the first driven-side transmission gear 62a meshing with the third driving-side transmission gear 61c, with the result that the first driven-side transmission gear 62a rotates in the direction indicated by the arrow $S_1$.

Referring now to FIG. 20, as set out above, since the biasing force acting in the direction of the arrow $S_2$ is constantly applied to the first driven-side transmission gear 62a, the first driven-side transmission gear meshes with the rack 55, while rotating in the direction of the arrow $S_1$.

That is to say, when the driving force acting in the direction of the arrow $S_1$ is applied to the first driven-side transmission gear 62a by the driving force produced by rotation of the driving motor 58 in its negative direction, this driving-force acting in the direction of the arrow $S_1$, is transmitted directly to the rack 55.

Therefore, in case that the driving force produced by rotation of the driving motor 58 to the negative direction is transmitted to the rack 55, there is no occurrence of backlash owing to an error of meshed engagement of toothed portions of the gears, in the same manner as the transmission of driving force to the rack 55 with the driving motor rotating to its positive direction.

That is to say, irrespective of positive and negative rotations of the driving motor 58, the first and second driving-side transmission gears 61a and 61b both mesh with the drive gear 59a at the aid of the spring-bias of the first coil spring 96, while the first and second driven-side transmission gears 62a and 62b mesh with the rack 55 at the aid of the spring-bias of the second coil spring 97. Under the above-mentioned particular meshing conditions, there is no occurrence of backlash.

Figure 22B:
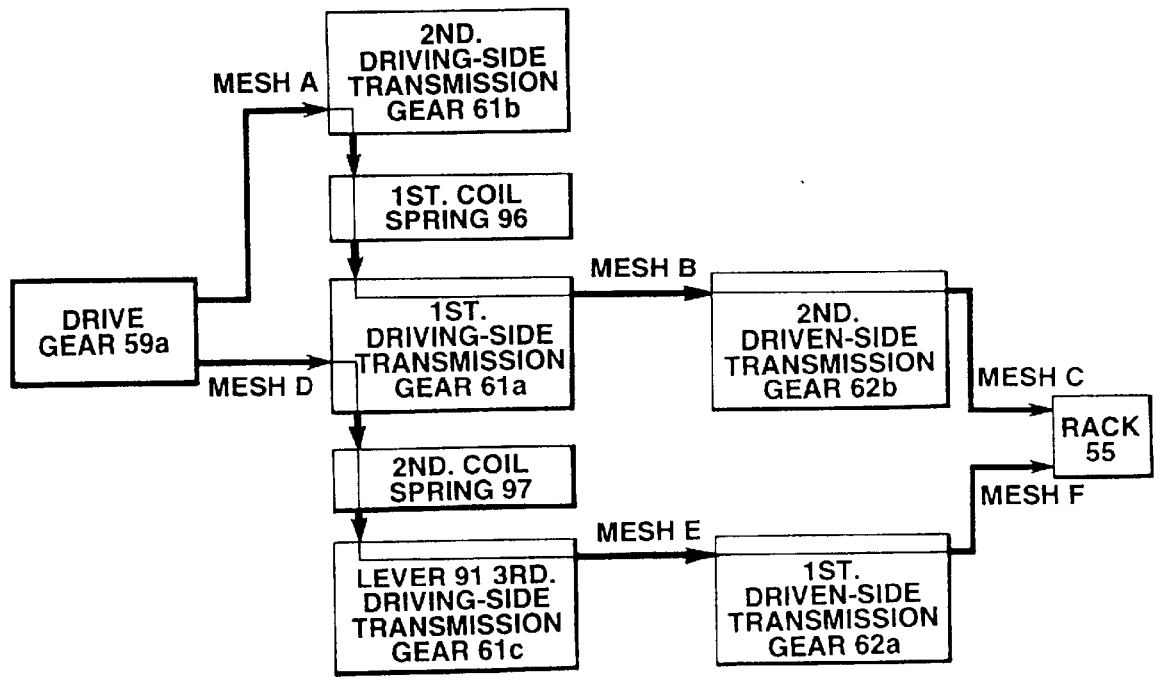

Hereinbelow explained are the transmission mechanism of the above-noted driving force and the principle of absorption of backlash, in accordance with FIG. 22(b), diagrammatically indicating the flow of driving force.

First, in case that the driving motor 58 rotates in the positive direction, the driving force produced by rotation of the motor is transmitted to the drive gear 61b, and further to first driving-side transmission gear 61a against the spring-bias of the first coil spring 96.

That is to say, in case that the driving motor 58 rotates in the positive direction, it will be appreciated that a first driving-force transmission path set forth above is formed.

Alternatively, in case that the driving motor 58 rotates in the negative direction, the driving force produced by rotation of the motor is transmitted from the drive gear 59a to the first driving-side transmission gear 61a, and further to both the lever 91 and the third driving-side transmission gear 61c against the spring-bias of the second coil spring 97.

After transmitted to the first driving-side transmission gear 61a, the driving force is transmitted finally to the rack 55.

That is to say, in case that the driving motor 58 rotates in the negative direction, it will be appreciated that a second driving-force transmission path set forth above is formed.

In the above-noted first transmission path, the meshed engagement between the drive gear 59a and the second driving-side transmission gear 61b, the meshed engagement between the first driving-side transmission gear 61a and the second driven-side transmission gear 62b, and the meshed engagement between the second driven-side transmission gear 62b and the rack 55 will be hereinafter referred to as "engagement A", "engagement B", and "engagement C", respectively.

In the above-noted second transmission path, the meshed engagement between the drive gear 59a and the first driving-side transmission gear 61a, the meshed engagement between the third driving-side transmission gear 61c and the first driven-side transmission gear 62a, and the meshed engagement between the first driven-side transmission gear 62a and the rack 55 will be hereinafter referred to as "engagement D", "engagement E", and "engagement F", respectively.

The first transmission path formed in case that the driving force is transmitted by rotation of the driving motor 58 to the positive direction, is constructed by only the engagements A, B and C in three different places. On the other hand, the second transmission path formed in case that the driving force is transmitted by rotation of the driving motor 58 to the negative direction, is constructed by only the three engagements D, E and F, each being different from any one of the engagements A, B and C.

That is to say, with regard to the respective meshed engagements A, B, C, D, E and F, since the toothed portions of the gears can be meshed to transmit the driving force only to one direction of the positive and negative directions, there is no occurrence of backlash when switching the driving direction among the positive direction and the negative direction.

Therefore, in the present embodiment, since backlashes a to c between the drive gear 59a and the rack 55 are eliminated by means of the first compression coil spring 96 and the second coil spring 97 both included in the driving-side transmission mechanism 61, only phase matching at the driving-side transmission mechanism 61 is required in order to achieve phase matching at the toothed portions of the gears in the transmission mechanism with the backlash eliminating mechanism, whereby assembling task can be simplified and assembling hours can be shortened.

Additionally, in the present embodiment, since the compression coil spring is not included in the rack 55 as compared with the prior art, the rack 55 is so designed to be small-sized in its width direction. Thus, when transferring the optical pick-up device 54, the moment of a force about the meshed engagement point with regard to the optical head carriage 53 can be set at the minimum, thereby reducing transfer loss in the head.

Furthermore, in the present embodiment, since the dimension of the rack 55 in its width direction is set to be small, the entire dimension of the unit can be small-sized in its width direction.

In addition to the above, in the embodiment, the provision of the through holes 68, 82 and 95, respectively formed in the first driving-side transmission gear 61a, the second driving-side transmission gear 61b, and the lever 91, is advantageous to be able to achieve phase matching at the toothed portions of the transmission gears 61a to 61c included in the driving-side transmission gear mechanism 61 by matching all openings of the through holes 68, 82 and 95 by way of insertion of a pin into them. This ensures more easy assembling work in the mechanisms.

In the embodiment, since the engaging portions 72 and 85 are provided respectively in the first driving-side transmission gear 61a and the second driving-side transmission gear 61b, these transmission gears can be integrally linked to each other by way of both the engaging portions 72 and 85. In view of this, it will be appreciated that the driving-side transmission gear mechanism 61 can be easily assembled.

Figure 23:
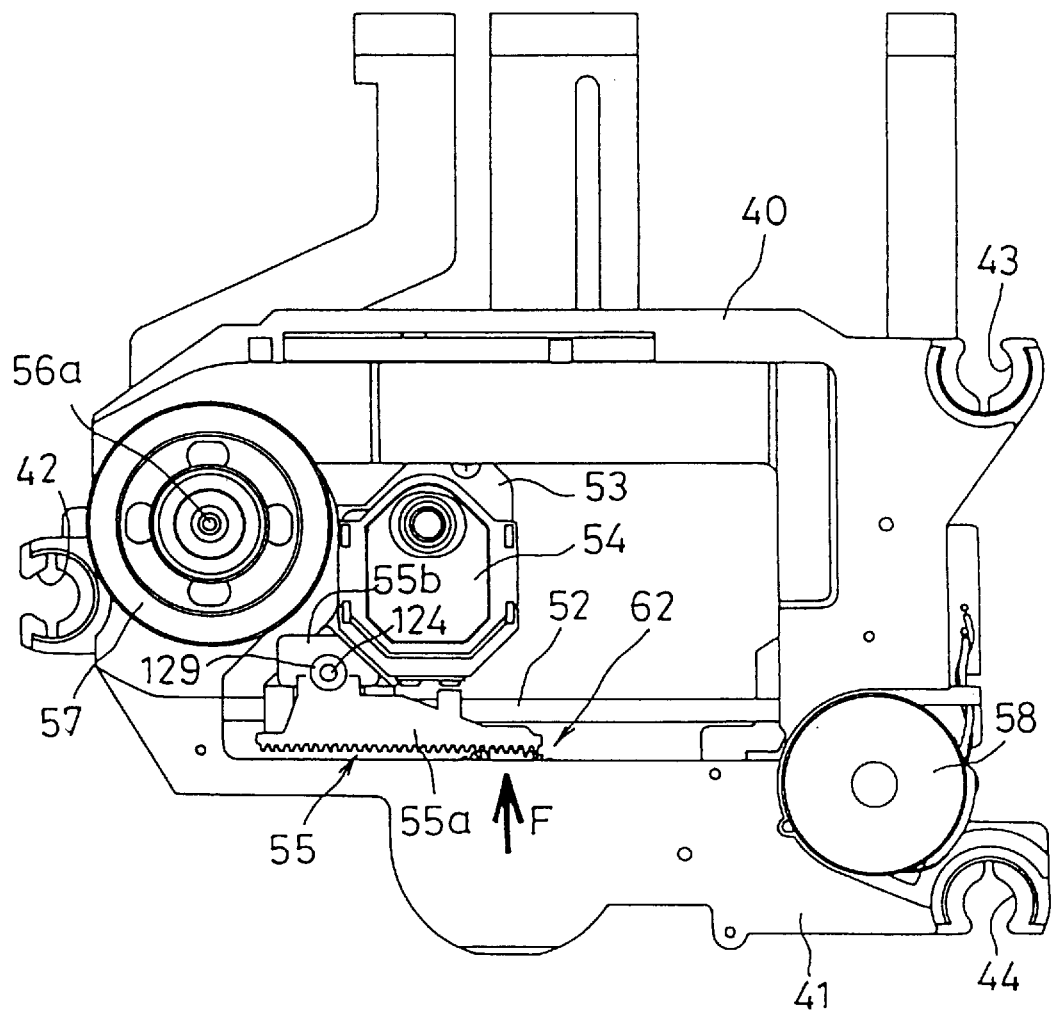
FIG. 23 is a plan view illustrating a state in which the head carriage of the disk unit of the invention is transferred in an inner peripheral position of the disk.
Figure 24:
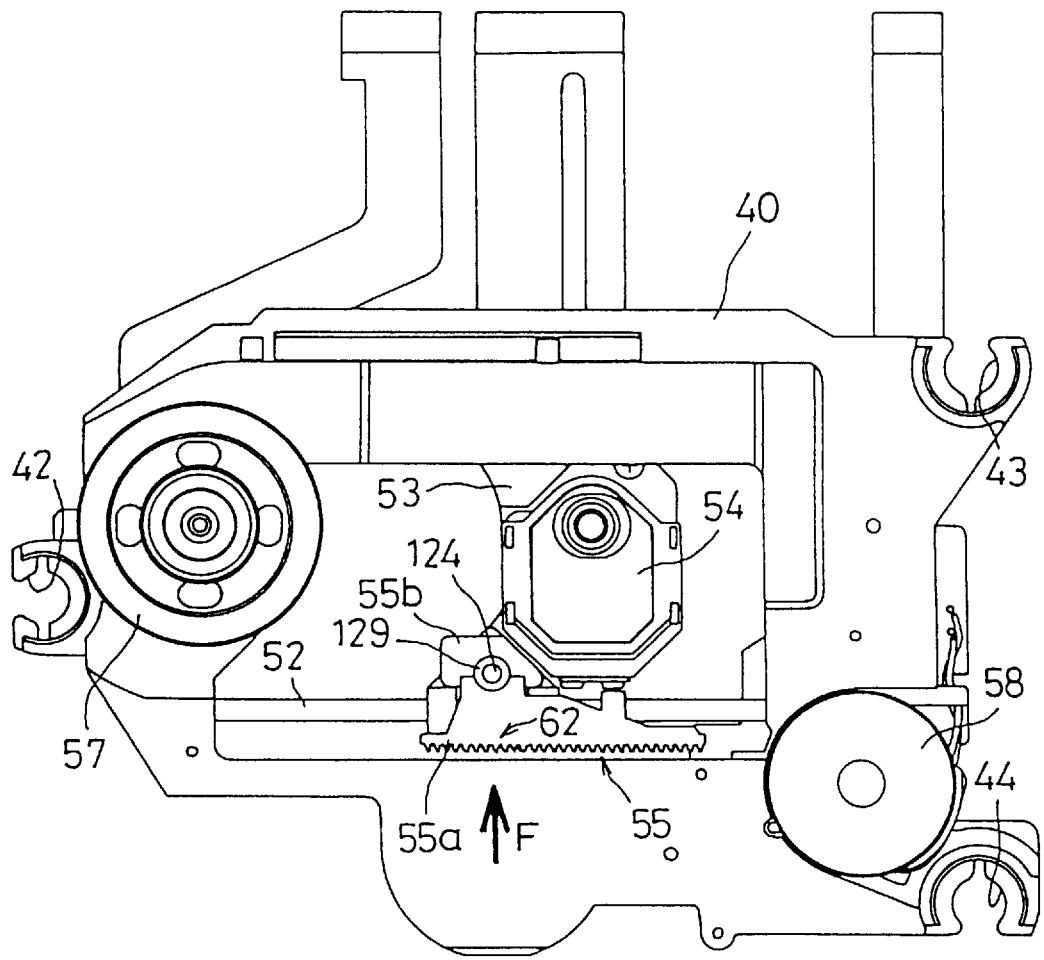
FIG. 24 is a plan view illustrating a state in which the head carriage of the disk unit of the invention is transferred in an outer peripheral position of the disk.

Moreover, when the optical head carriage 53 moves in the tray loading direction (the direction indicated by the arrow a) along both the guide shafts 51 and 52, the rack 55 receives a side pressure F through the intermediate transmission mechanism 60 by means of the first and second coil springs 96 and 97 during transferring from the innermost peripheral disk-position shown in FIG. 23 to the outermost peripheral disk-position shown in FIG. 24. However, since the rack is rotatable about the rack support pin 124, the rack can receive the side pressure such that the side pressure is dispersed at the setting positions of the bearings 45 and 46 and at the setting position of the projected portion 127. As a result, a smooth motion of the optical head carriage 53 is assured.

In this case, the moment of a force about the rack support pin 124, which moment acting on the rack 55 owing to the side pressure F, the shortest distance (the arm of moment) from the point of act (the meshing point between the rack 55 and either one of the first and second driven-side transmission gears 62a and 62b) of the side pressure F to the fulcrum (the rack support pin 124) becomes maximum at the innermost peripheral disk-transfer position of the rack 55 as shown in FIG. 23 and becomes minimum at the outermost peripheral disk-transfer position as shown in FIG. 24.

Hereinbelow explained is a process according to another aspect of the invention for assembling a transmission mechanism which mechanism drives the head carriage, utilizing FIGS. 1, 2, 4 and 5.

First, the first driven-side transmission gear 62a and the second driven-side transmission gear 62b are inserted in turns into the support shaft 41a, so that the driven-side transmission mechanism 62 is brought into meshed engagement with the rack 55.

At this time, the first driven-side transmission gear 62a and the second driven-side transmission gear 62b are assembled to each other in such a manner that the through hole 62A₁ of the first driven-side transmission gear 62a and the through hole 62B₁ of the second driven-side transmission gear 62b are matched to each other, and additionally the projected portion 62A₂ of the first driven-side transmission gear 62a is fitted to the frame-like portion 62B₂ of the second driven-side transmission gear 62b.

Subsequently, the drive gear 59a is inserted into the support shaft 41c so that the drive-gear mechanism 59 is brought into meshed engagement with the motor gear 58a of the driving motor 58.

Thereafter, the driving-side transmission mechanism 61 is interleaved between the drive-gear mechanism 59 and the driven-side transmission mechanism 62.

At this case, after the cylindrical body 86 of the third driving-side transmission gear 61c has been inserted into the center hole 64 of the first driving-side transmission gear 61a, the respective resilient portions 87 and 88 of the inserted end are inserted into the through hole 92A of the lever 91. After the projected portion 92b of the lever 91 has been fitted into the cutouts 89 and 90, the boss 77 of the second driving-side transmission gear 61b is placed into the cylindrical body 86, and the nailed portions 87a and 88a are engaged with the stepped portions 78 and 79 by loosely fitting the resilient portions 87 and 88 into the through holes 74a and 74b.

At this time, the first driving-side transmission gear 61a, the second driving-side transmission gear 61b, the third driving-side transmission gear 61c and the lever 91 are assembled to each other in such a manner that the through hole 68 of the first driving-side transmission gear 61a, the through hole 82 of the second driving-side transmission gear 61b and the through hole 95 of the lever 95 are matched to each other, and additionally the engaging portion 72 (the horizontal portion 72b) of the first driving-side transmission gear 61a is fitted to the engaging portion 86 of the second driving-side transmission gear 61b.

Thereafter, the support shaft 41b is fitted into the positioning hole 135b of the thrust receiving plate 135, and then the engaging portion 135a is engaged with the guide shaft 52. The thrust receiving plate 135 is fixed on the holding plate 41 by way of screws 136.

Thereafter, the first compression coil spring 96 is hanged between the spring hanger 71 (the horizontal portion 71b) of the first driving-side transmission gear 61a and the spring hanger 84 of the second driving-side transmission gear 61b, such that the spring is disposed within the through window 67 of the transmission gear 61a and within the through window 81 of the transmission gear 61b, while the second compression coil spring 97 is hanged between the spring hanger 70 (the horizontal portion 70b) of the first driving-side transmission gear 61a and the spring hanger 93 of the lever 91, such that the spring is disposed within the through window 66 of the transmission gear 61a and within the through window 80 of the transmission gear 61b.

In this manner, the transmission mechanism driving the head carriage can be assembled.

Hereinbelow explained are a disk chucking operation, a disk reproduction operation, a disk chucking release operation, a disk-tray loading operation, an eject operation, and an emergency eject operation, in the optical disk unit according to the present embodiment.

Disk Chucking Operation

Figure 35:
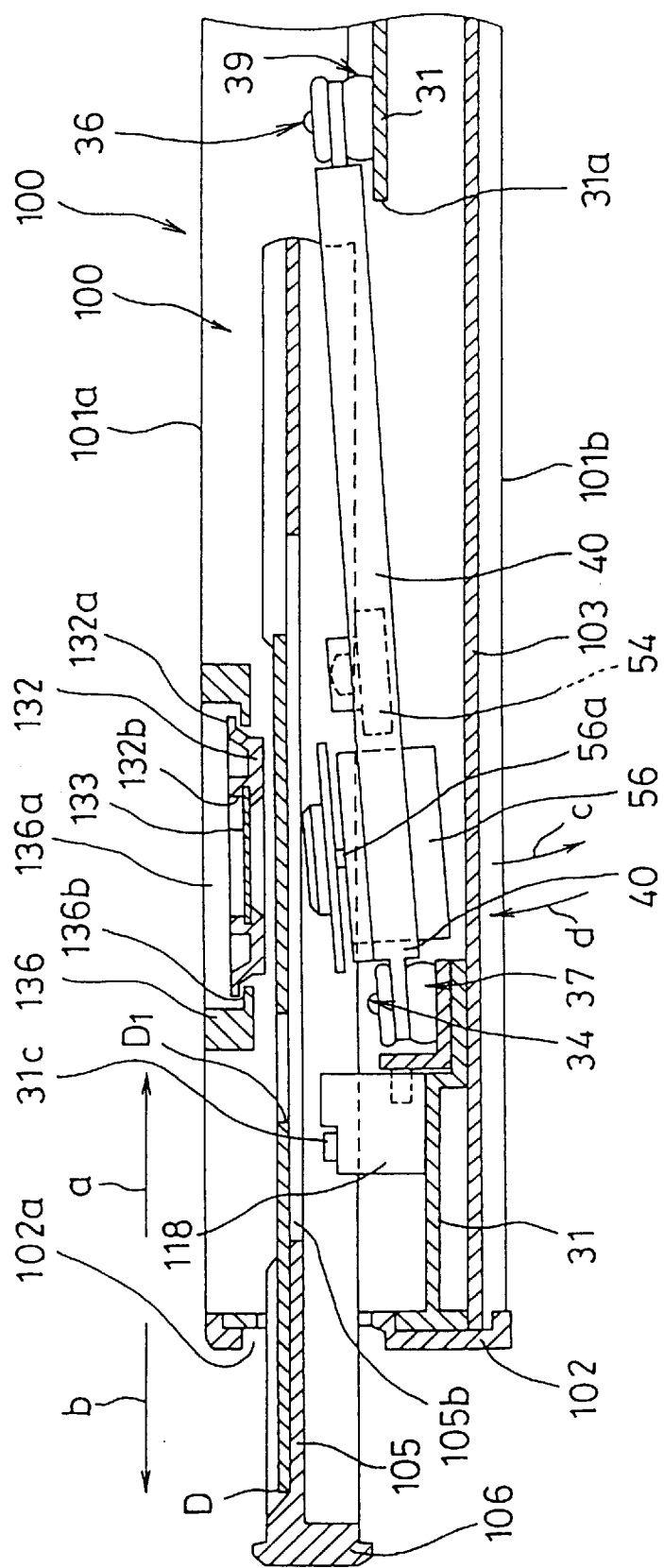
FIG. 35 is a cross-sectional view taken along the line K—K in FIG. 34, indicating a disk-chucking released state in a disk chucking mechanism of the disk unit of the invention.

As shown in FIG. 35, under a condition in which the unit holder 40 descends to its descended position in the direction indicated by the arrow c owing to dead load, the disk D is horizontally inserted into the casing 101 in the direction of the arrow a by way of the disk tray 104, so that the disk is positioned between the disk table 57 and the chucking pulley 132.

Figure 36:
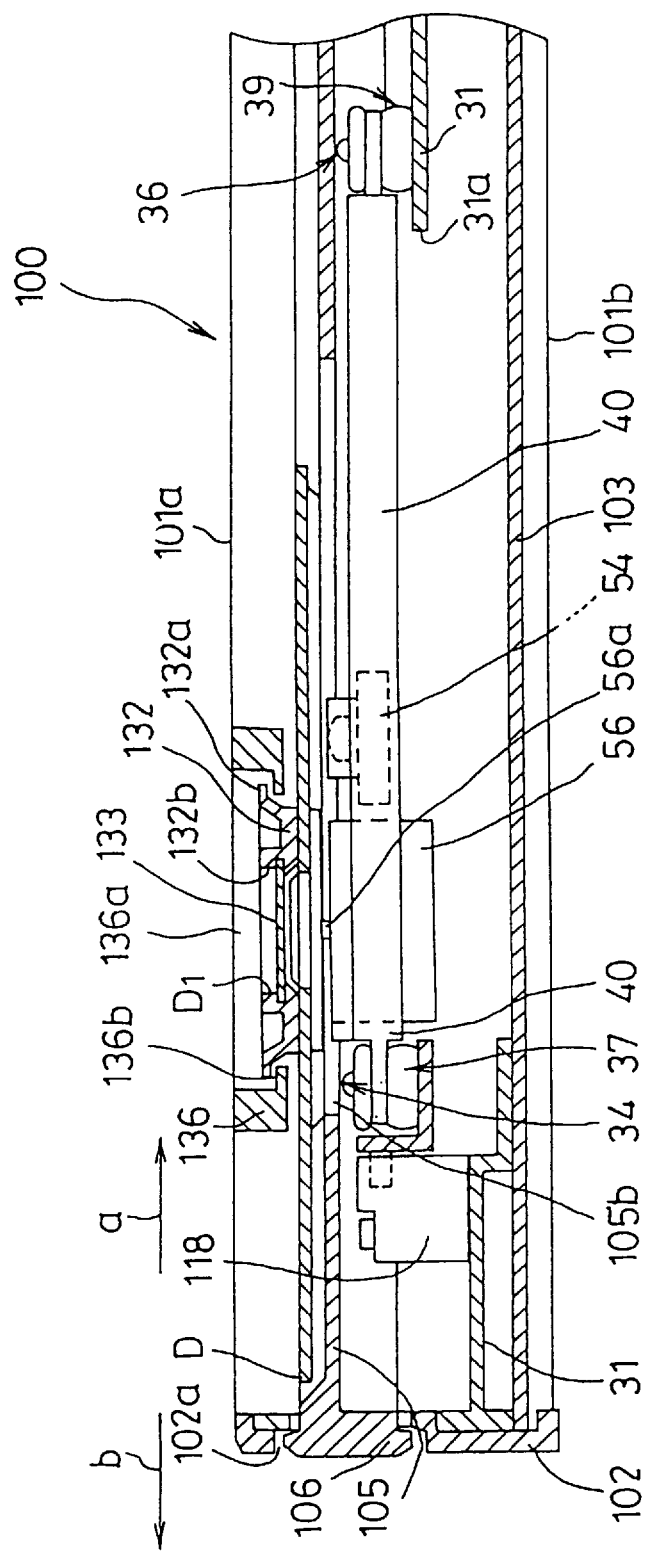
FIG. 36 is a cross-sectional view taken along the line K—K in FIG. 34, indicating a disk chucking state in the disk chucking mechanism of the disk unit of the invention.

After completion of loading the disk tray 104, the holder driving lever 110 rotates in the direction of the arrow d, with the result that the unit holder 40 also rotates in the direction of the arrow d until the holder reaches its ascended position and then the holder is kept horizontally, as seen in FIG. 36.

At this time, the disk table 57 put on the unit holder 40 is inserted into the concavity 105*a* of the disk tray 104 through the opening 105*b* in the direction of the arrow d, and the disk table is thus fitted into the center hole $D_1$ of the optical disk D, and additionally, the optical disk D is lifted up within the concavity 105*a* of the disk tray 104.

The disk table 57 lifts up the chucking pulley 132 together with the optical disk D and simultaneously operates to attract a metal plate 133 of the chucking pulley 132 downwards by means of a chucking magnet (not shown) placed on the disk table 57.

Additionally, the chucking pulley 132 magnetically absorbs the perimeter of the center hole $D_1$ of the optical disk D onto the disk table 57.

Disk Reproduction Operation

After the optical disk D has been chucked, the optical disk D rotates together with the disk table 57 by means of the spindle motor 56, and then information stored in the optical disk D is reproduced by the optical pick-up device 54 while traveling the optical head carriage 53 in the direction indicated by the arrows a or b by means of the driving motor 58.

Disk Chucking Release Operation

After reproduction of the optical disk D, when the holder driving lever 110 rotates in the direction of the arrow c, and then the unit holder 40 descends again in the direction of the arrow c at the aid of dead load as seen in FIG. 35, the disk table 57 is removed out of the center hole $D_1$ of the optical disk D and further descends to the downward position of the disk tray 104 in the direction of the arrow c.

Then, the optical disk D is relocated within the concavity 105*a* of the disk tray 104. Additionally, the chucking pulley 132 is held above the optical disk D by abutting the flanged portion 132*a* with the peripheral edge of the through hole 136*a* of the pulley holder 136.

Thereafter, the optical disk D lying in the casing 101 is ejected out of the casing 101 in the direction of the arrow b together with the disk tray 104.

Disk-tray Loading Operation

Figure 29:
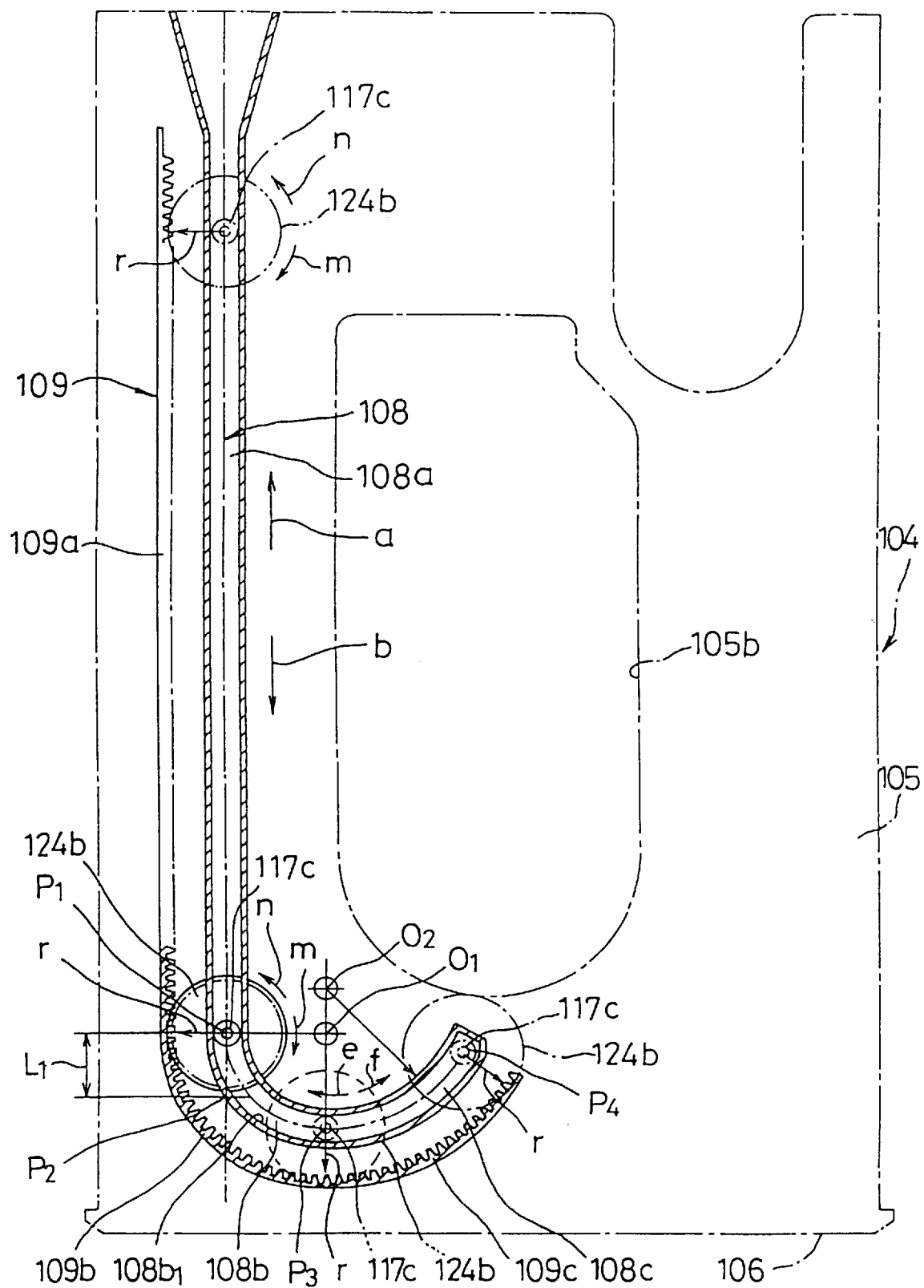
FIG. 29 is a plan view indicating relative position relations among a rack of the disk tray, a guide groove, pinions, and a guide pin in the disk unit of the invention.
Figure 30:
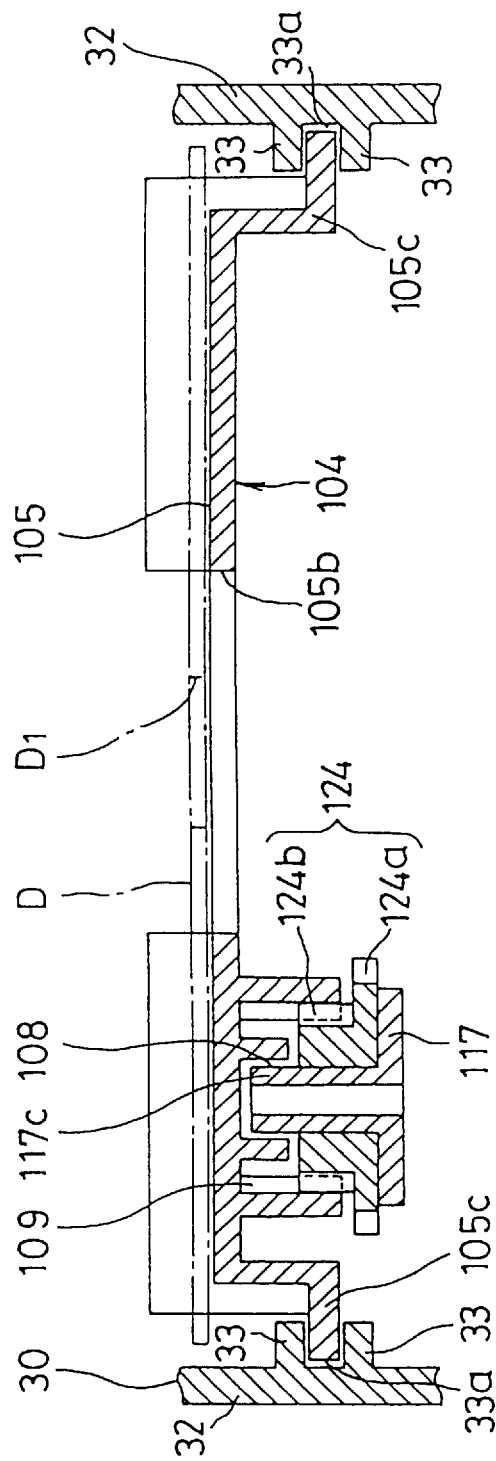
FIG. 30 is a cross-sectional view taken along the line H—H shown in FIG. 28.
Figure 31:
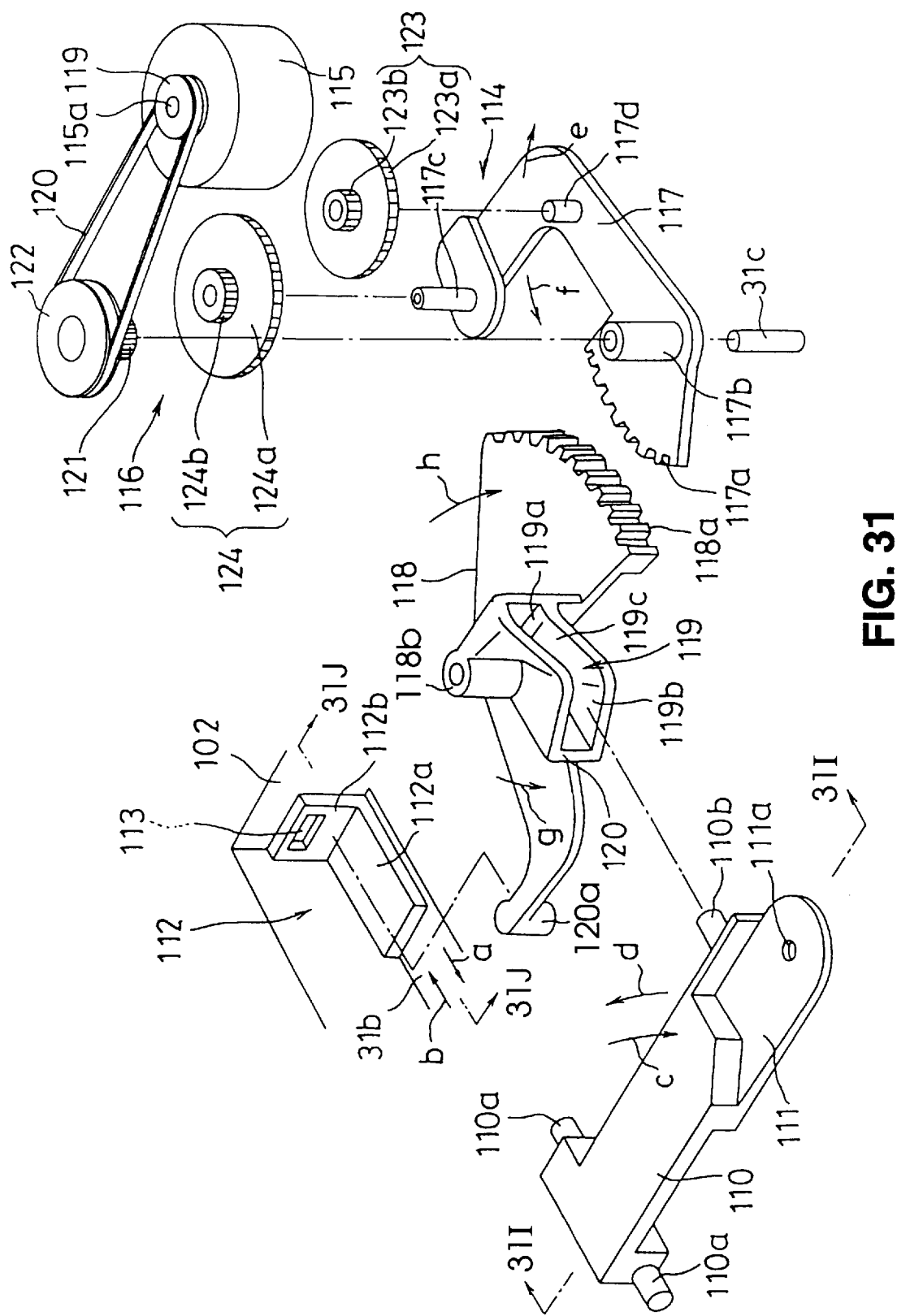
FIG. 31 is an exploded perspective view illustrating a disk-tray driving mechanism in the disk unit of the invention.

Under a condition of completion of ejecting operation, wherein the disk tray 104 is transferred in the direction of the arrow b as shown in FIG. 37, the small-size gear 124*b* and the guide pin 117*c* are both positioned at the end of the straight portion 109*a* of the rack 109 of the disk tray 104 and the straight portion 108*a* of the guide groove 108 of the disk tray, which end corresponds to the end in the tray loading direction a, as indicated by the two-dotted line of FIG. 29.

Figure 26:
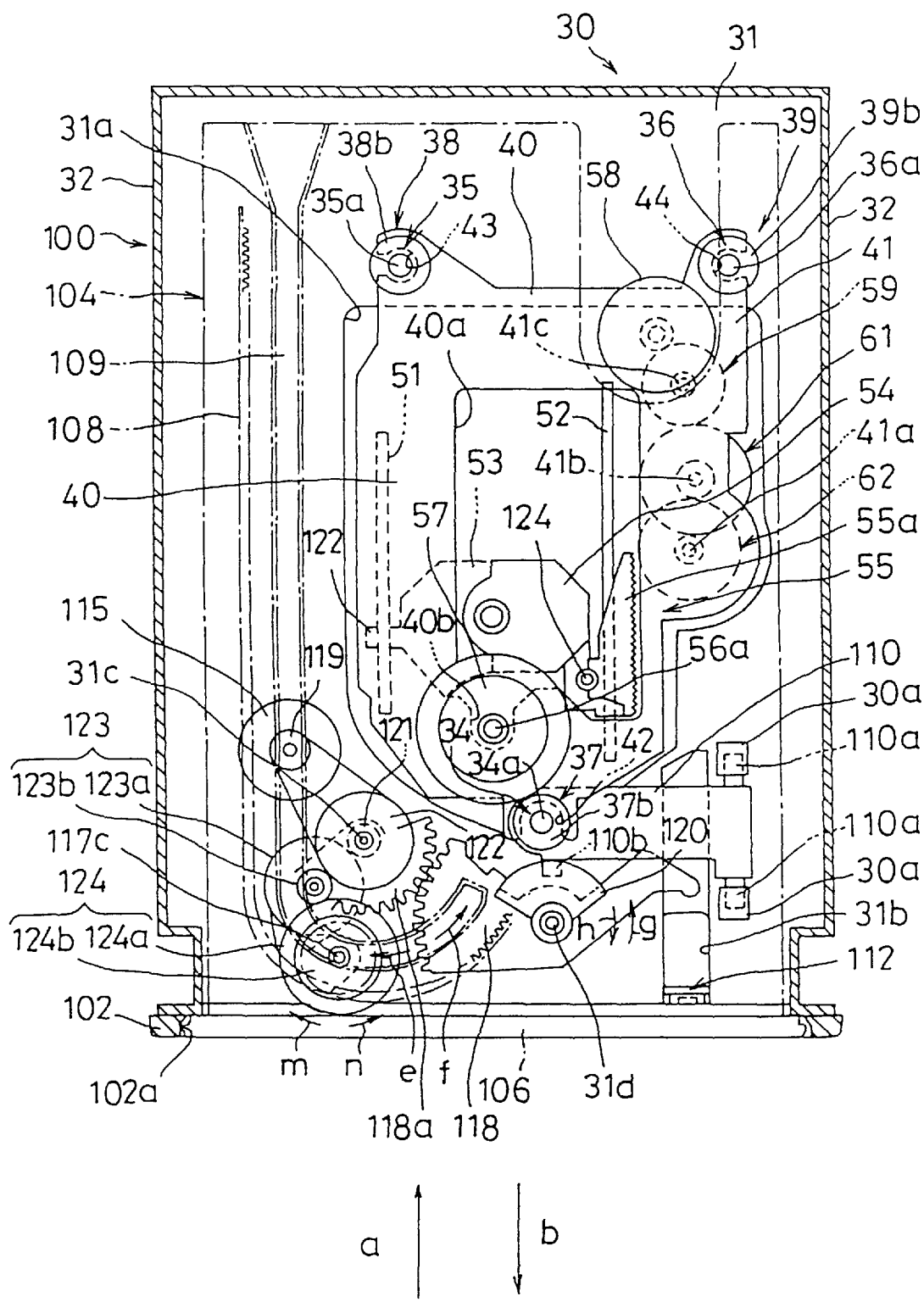
FIG. 26 is a plan view indicating a state of completion of loading of a disk tray in the disk unit of the invention.
Figure 27:
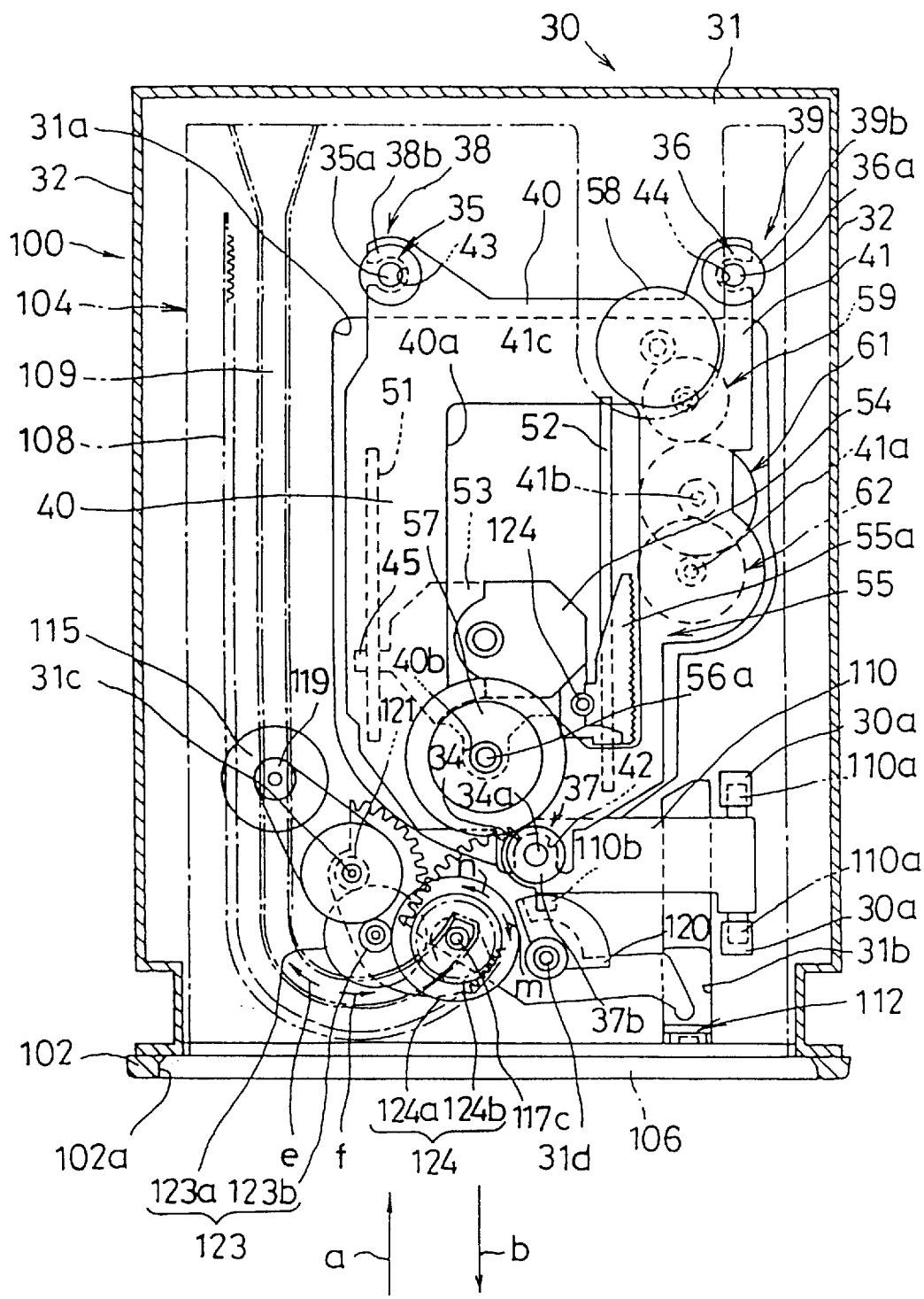
FIG. 27 is a plan view indicating a state of completion of chucking of the disk in the disk unit of the invention.
Figure 28:
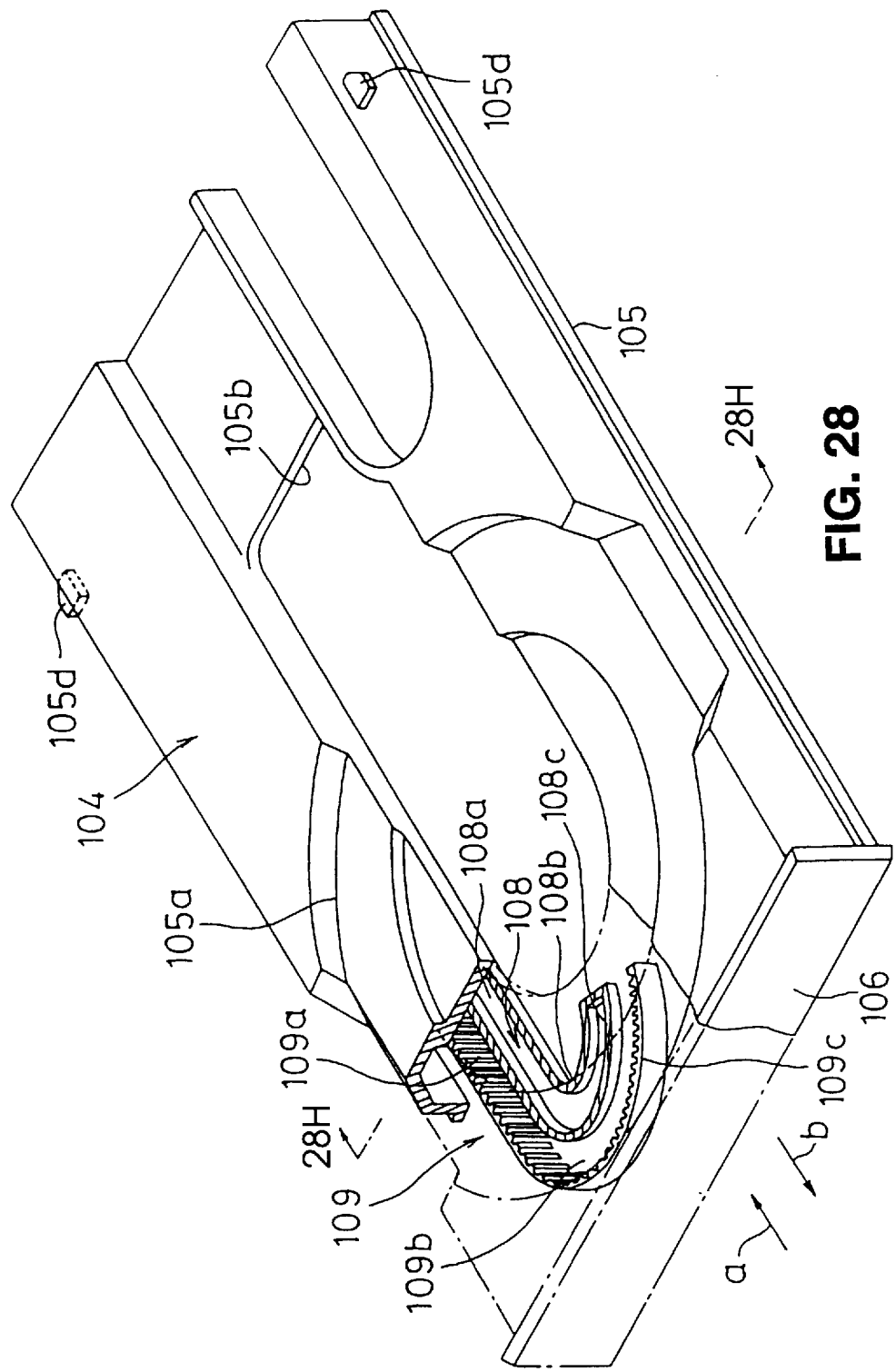
FIG. 28 is a perspective view illustrating the disk tray of the disk unit of the invention, partly cut-out.

In the above-noted positioned state, when the loading switch (not shown) is switched ON, the driving motor 115 rotates in its positive direction as seen in FIGS. 25 to 27, and as a result the small-size gear 124*b* of the output gear 124 rotates in the direction indicated by the arrow m at the position indicated by the two-dotted line of FIG. 29.

In this case, the guide pin 117*c* engages with the straight portion 108*a* of the guide groove 108. As a result of the engagement, free rotation about the support shaft 31*c* of the gear base 117 in both directions indicated by the arrows e and f, is restricted.

Thus, the small-size gear 124*b* rotates in the direction of the arrow m at the restricted position, with the result that the small-size gear 124*b* drives the rack in the direction of the arrow a along the straight portion 109*a* of the rack 109.

Then, the disk tray 104 is inserted into the casing 101 together with the rack 109 in the direction of the arrow a, while the small-size gear 124*a* and the guide pin 117*c* are cooperative to relatively move the straight portion 108*a* of the guide groove 108 in the direction of the arrow b.

In accordance with advancement of loading of the disk tray 104 in the direction of the arrow a, the small-size gear 124*b* and the guide pin 117*c* reach the intersecting point $P_1$ between the center line of the straight portion 108*a* of the guide groove 108 and the center line of the first circular portion 108*b*, as shown in the solid line of FIGS. 25 and 29.

Thereafter, by way of further positive rotation of the small-size gear 124*b* in the direction of the arrow m, the small-size gear 124*b* rolls in the direction of the arrow f along the first circular portion 109*b* of the rack 109. The gear base 117 rotates with the support shaft 31*c* as the center $O_2$ in the direction of the arrow f. The guide pin 117*c* advances along the first circular portion 108*b* of the guide groove 108 in the direction of the arrow f.

At this time, since the radius $R_1$ of curvature of the center line of the first circular portion 108*b* of the guide groove 108 is so designed to be smaller than the turning radius of the guide pin 117*c* with the support shaft 31*c* as the center $O_2$, a traveling velocity of the disk tray 104 to the direction of the arrow a becomes decreased, as the guide pin 117*c* advances along the first circular portion 108*b* in the direction of the arrow f.

That is to say, as seen in FIG. 29, set at approximately 10.5 mm for example, is the distance $L_1$ between two intersecting points, one intersecting point $P_2$ being an intersecting point between an extension line of the center line of the second circular portion 108*c* of the guide groove 108 extending in the direction of the arrow e and having the radius $R_2$ of curvature equal to the turning radius of the guide pin 117*c* with the support shaft 31*c* as the center $O_2$ and an extension line of the center line of the straight portion 108*a* extending in the direction of the arrow b, and the other intersecting point $P_1$ being an intersecting point between the center line of the straight portion 108*a* and the center line of the first circular portion 108*b*. As shown in the broken lines in FIGS. 26 and 29, when the small-size gear 124*b* and the guide pin 117*c* have reached the intersecting point $P_3$ between the center line of the first circular portion 108*b* of the guide groove 108 and the center line of the second circular portion 108*c*, the entire length of the disk tray 104 has been inserted in the casing 101 in the direction of the arrow a, and thus the loading operation has been completed.

Subsequently to the above, in accordance with further positive rotation of the small-size gear 124*b* in the direction of the arrow m, the gear rolls along the second circular portion 109*c* of the rack 109 in the direction of the arrow f. Such rolling distance corresponds to an advancement step during overstroke operation.

Owing to the advancement step during overstroke operation of the small-size gear 124*b* in the direction of the arrow f, the gear base 117 advances along the second circular portion 108*c* of the guide groove 108 in the direction of the arrow f.

In this case, since the radius $R_2$ of curvature of the center line of the second circular portion 108*c* of the guide groove 108 is set to be equal to the turning radius of the guide pin 117*c* with the support shaft 31*c* as the center $O_2$, the guide pin 117*c* advances along the second circular portion 107*c* in the direction of the arrow f, and thus the disk tray 104 remains held in the loading completion position.

Thereafter, as seen in one-dotted line of FIG. 29, through a rotational angle of the gear base 117 or the like, upon a detection switch (not shown) detects that the small-size gear 124b and the guide pin 117c have been reached the terminus P$_4$ of the second circular portion 108c of the guide groove 108, the driving motor 115 is stopped.

As shown in FIGS. 25 to 27, when the small-size gear 124b advances from the intersecting point P$_1$ via the intersecting point P$_3$ to the terminus P$_4$ in the direction of the arrow f, the gear base 117 rotates about the support shaft 31c in the direction of the arrow f from the position indicated in FIG. 25 to the position indicated in FIG. 27, and as a result the cam lever 118 rotates in the direction of the arrow h from the position indicated in FIG. 25 to the position indicated in FIG. 27 through the sectorial gear 118a meshing with the sectorial gear 117a of the gear base 117.

Then, the cam 120 of the cam lever 118 rotates in the direction of the arrow h with respect to the lever operating pin 110b.

Figure 32A:
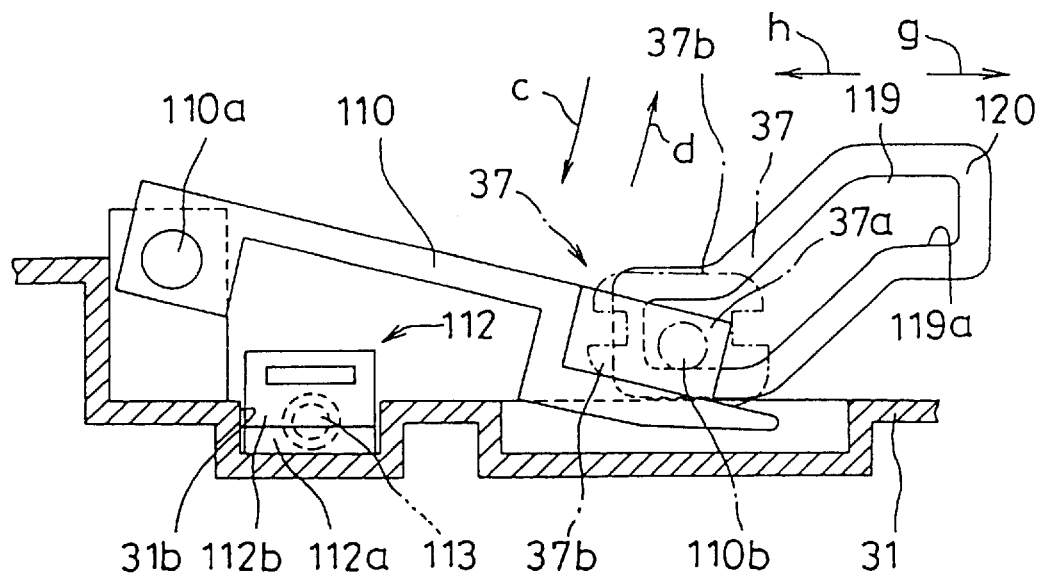
FIGS. 32(A) and 32(B) are views in the direction of the arrow I—I in FIG. 31, indicating a rotational movement of a holder driving lever in the disk unit of the invention.

Additionally, while the small-size gear 124b advances in the direction of the arrow f from the intersecting point P$_1$ to the intersecting point P$_3$, the lever operating pin 110b of the holder driving lever 110 relatively moves in the direction of the arrow g along within the low-level portion 119b of the concave groove 119 of the cam 120, as shown in FIG. 32(A).

During the advancement step of the overstroke operation, the small-size gear 124b advances in the direction of the arrow f from the intersecting point P$_3$ to the terminus P$_4$, the lever operating pin 110b passes through the sloped portion 119c of the concave groove 119 and is lifted up to the high-level portion 119a in the direction of the arrow d, and thus the holder driving lever 110 rotates in the direction of the arrow d.

For the reasons indicated above, during the advancement step of the overstroke operation of the small-size gear 124b in the direction of the arrow f after completion of loading of the disk tray 104, the unit holder 40 rotates in the direction of the arrow d from the descended position shown in FIG. 35 to the ascended position shown in FIG. 36 by way of the driving lever 110, so as to perform a chucking operation of the optical disk D. The optical disk D is pushed up within the concavity 105a of the disk tray 104 and thus the disk is magnetically absorbed onto the disk table 57.

Disk Tray Eject Operation

Next, the disk tray 104 is ejected out of the casing 101 in the direction of the arrow b in the revere order as the above-noted loading operation, by shifting the eject switch (not shown) to its ON state, or by rotating the driving motor 115 in its negative rotational direction in accordance with an eject signal generated from a host computer (not shown).

That is to say, as shown in one-dotted line of FIGS. 27 and 29, when the small-size gear 124b is rotated in its negative direction indicated by the arrow n at the terminus P$_4$ of the second circular portion 108c of the guide groove 108 by means of the driving motor 115, the small-size gear travels along the second circular portion 109c of the rack 109 in the direction of the arrow e from the intersecting point P$_4$ to the intersecting point P$_3$ at the return step of the overstroke operation, as shown in FIGS. 26 and 29, while the gear base 117 rotates in the direction of the arrow e from the position indicated in FIG. 27 to the position indicated in FIG. 26.

For the reasons indicated above, the cam lever 118 in the direction of the arrow g from the position indicated in FIG. 27 to the position indicated in FIG. 26, while the lever operating pin 110b slides from the high-level portion 119a of the concave groove 119 through the sloped portion 119c down to the low-level portion 119b by way of dead load as seen in FIG. 32(A), and thus the holder driving lever 110 rotates in the direction of the arrow c by way of dead load.

In synchronization with rotational movement of the holder driving lever 110, the unit holder 40 rotates in the direction of the arrow c by the aid of dead load from the descended position indicated in FIG. 36 to the ascended position indicated in FIG. 35, with the result that the chucking release operation of the optical disk D is executed and the optical disk D is placed on the concavity 105a.

When the small-size gear 124b further rotates in the reverse rotational direction as indicated by the arrow n, the small-size gear 124b and the guide pin 117c advance respectively along the first circular portions 109b and 108b of the rack 109 and the guide groove 108 in the direction of the arrow e from the intersecting point P$_3$ to the intersecting point P$_1$ as seen in FIGS. 26 and 29.

At this time, by the aid of cam action between the first circular portion 108b of the guide groove 108 and the guide pin 117c, i.e., by a component force F$_1$ acting in the direction of the arrow b, created by pushing the circular surface 108b$_1$ of the first circular portion 108b of the guide groove 108 through the guide pin 117c in the direction of the arrow f, the disk tray 104 is pushed out of the casing 101 by the distance L$_1$ in the direction of the arrow e.

Additionally, as seen in FIG. 32(A), the lever operating pin 110b relatively moves in the direction of the arrow h within the low-level portion 119b of the concave groove 119.

When the small-size gear 124b rotates continuously in the negative rotational direction as indicated by the arrow n, so as to drive the straight portion 109a of the rack 109 in the direction of the arrow b, the disk tray 104 is ejected out of the casing 101 in the direction of the arrow b as seen in FIG. 37, and then the small-size gear 124b and the guide pin 117c relatively move along the straight portion 108a of the guide groove 108 in the direction of the arrow a to the position indicated by the two-dotted line of FIG. 29.

Figure 34:
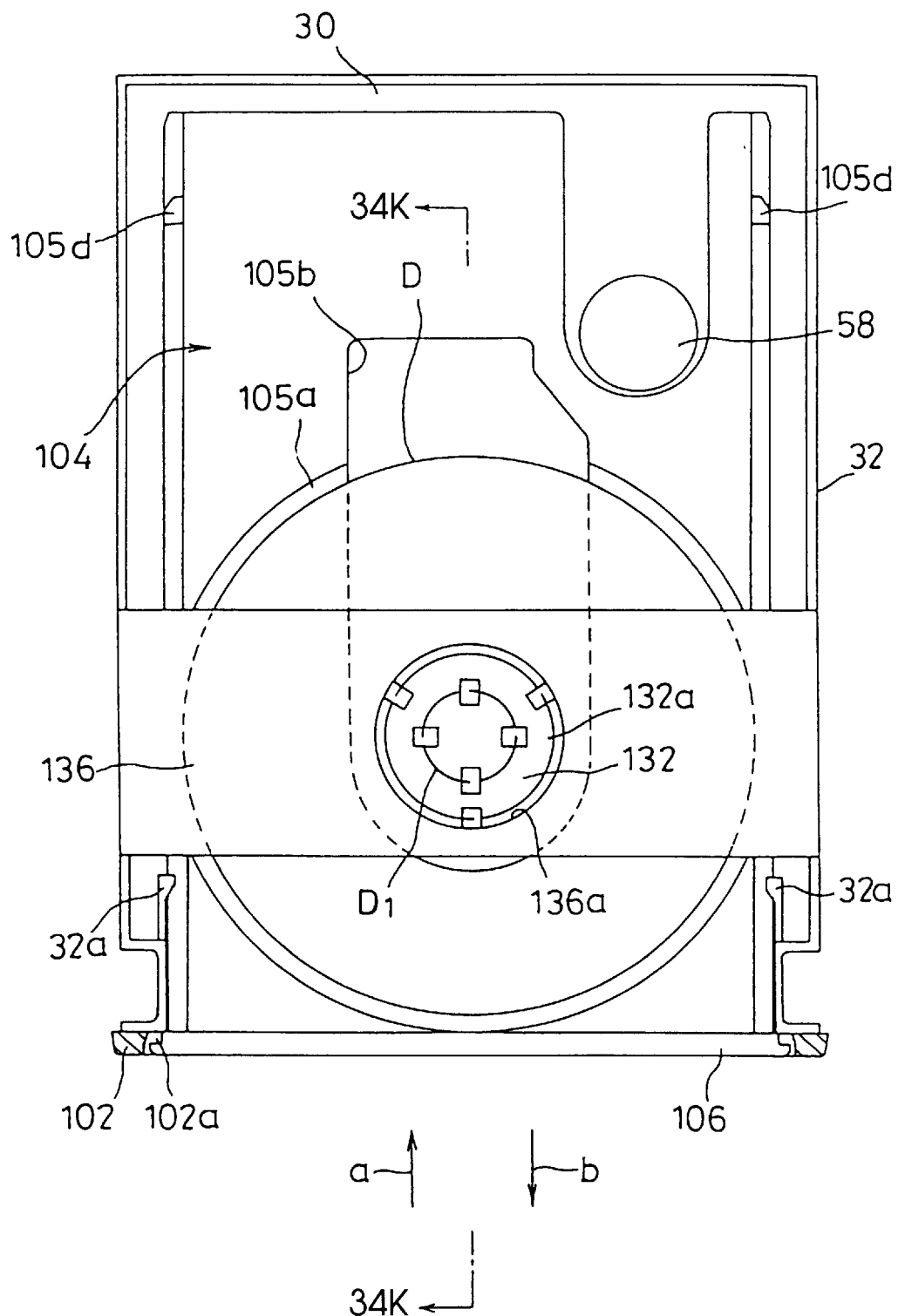
FIG. 34 is a plan view illustrating a state in which the upper cover of the disk unit of the invention is removed.

Thereafter, as shown in FIG. 34, through abutment of the projected portion 105d of the disk tray 104 to the stopper 32a of the chassis 30, the ejecting operation of the disk tray 104 is completed, and then the completion of the eject is detected by an eject-completion switch (not shown) and the driving motor 115 is stopped.

Emergency Eject Operation

Figure 32B:
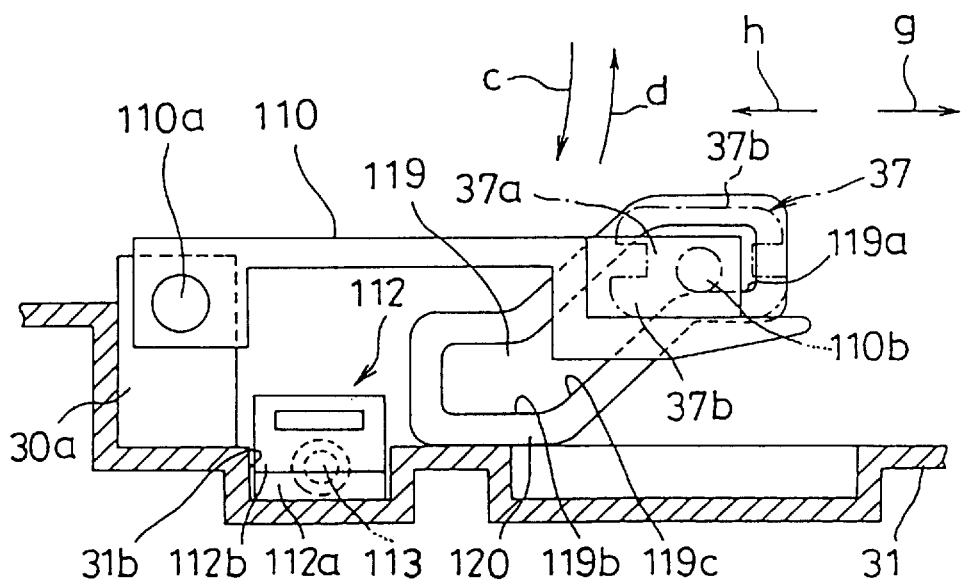
Figure 33:
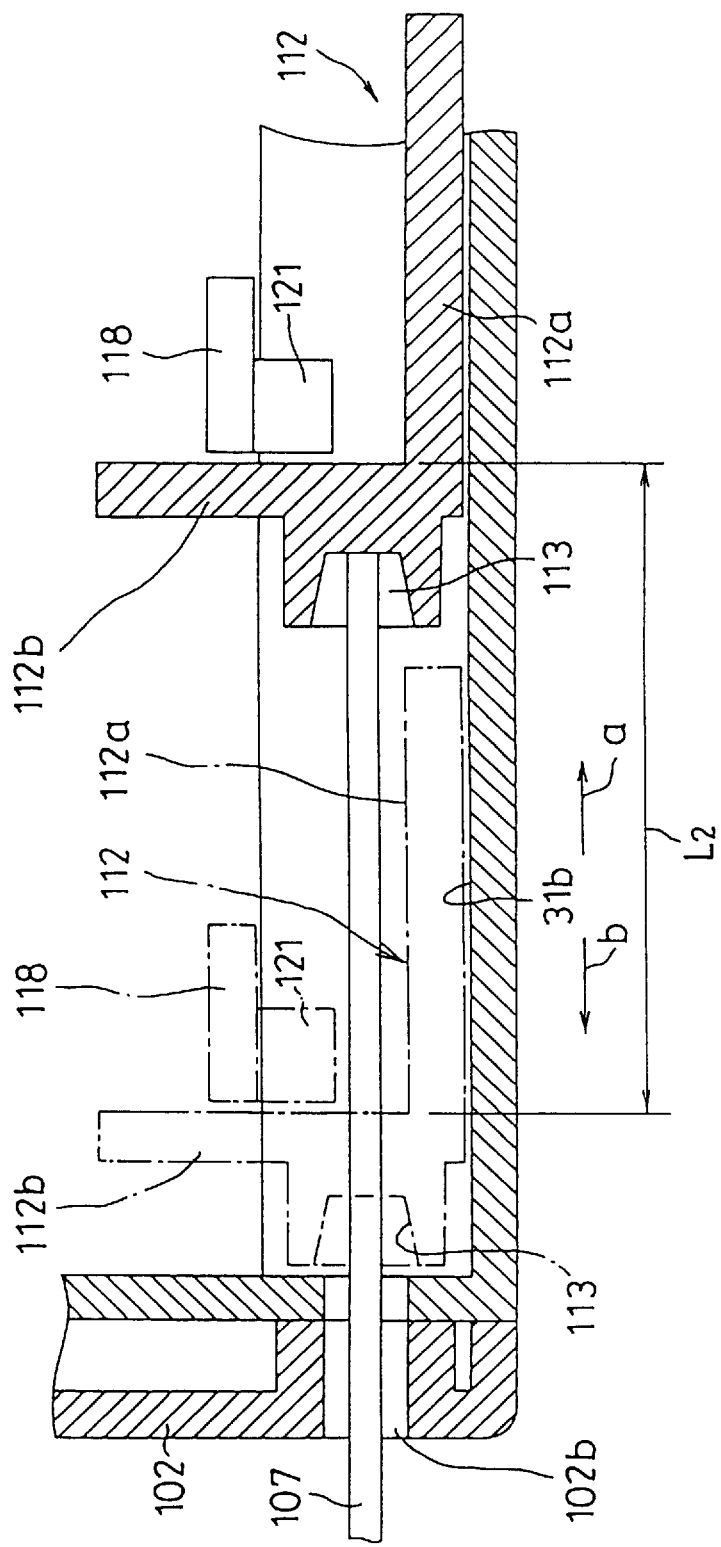
FIG. 33 is a view in the direction of the arrow J—J in FIG. 31, indicating the emergency ejecting operation in the disk unit of the invention.
Figure 38:
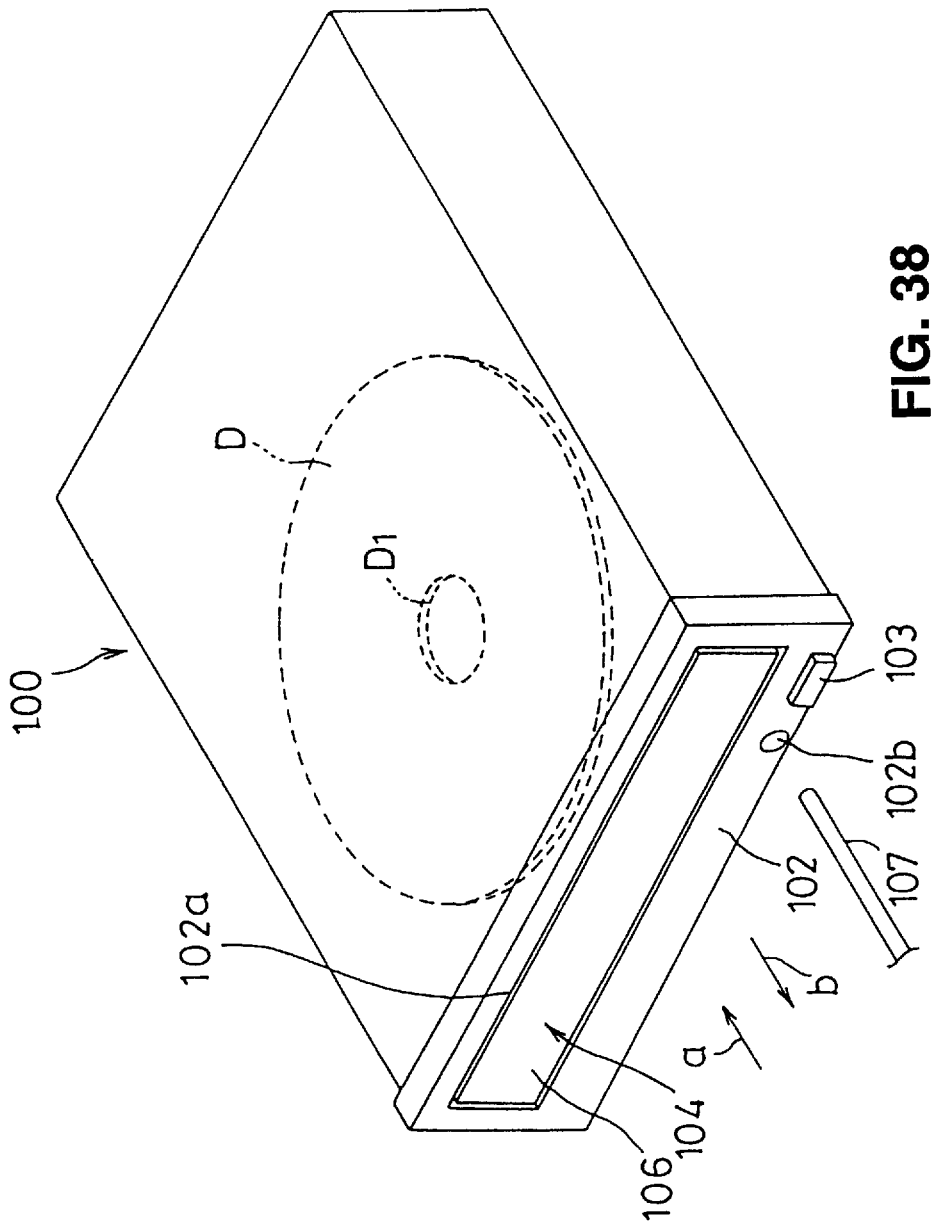
FIG. 38 is a perspective view illustrating a state of completion of loading of the disk tray in the disk unit of the invention.
Figure 39:
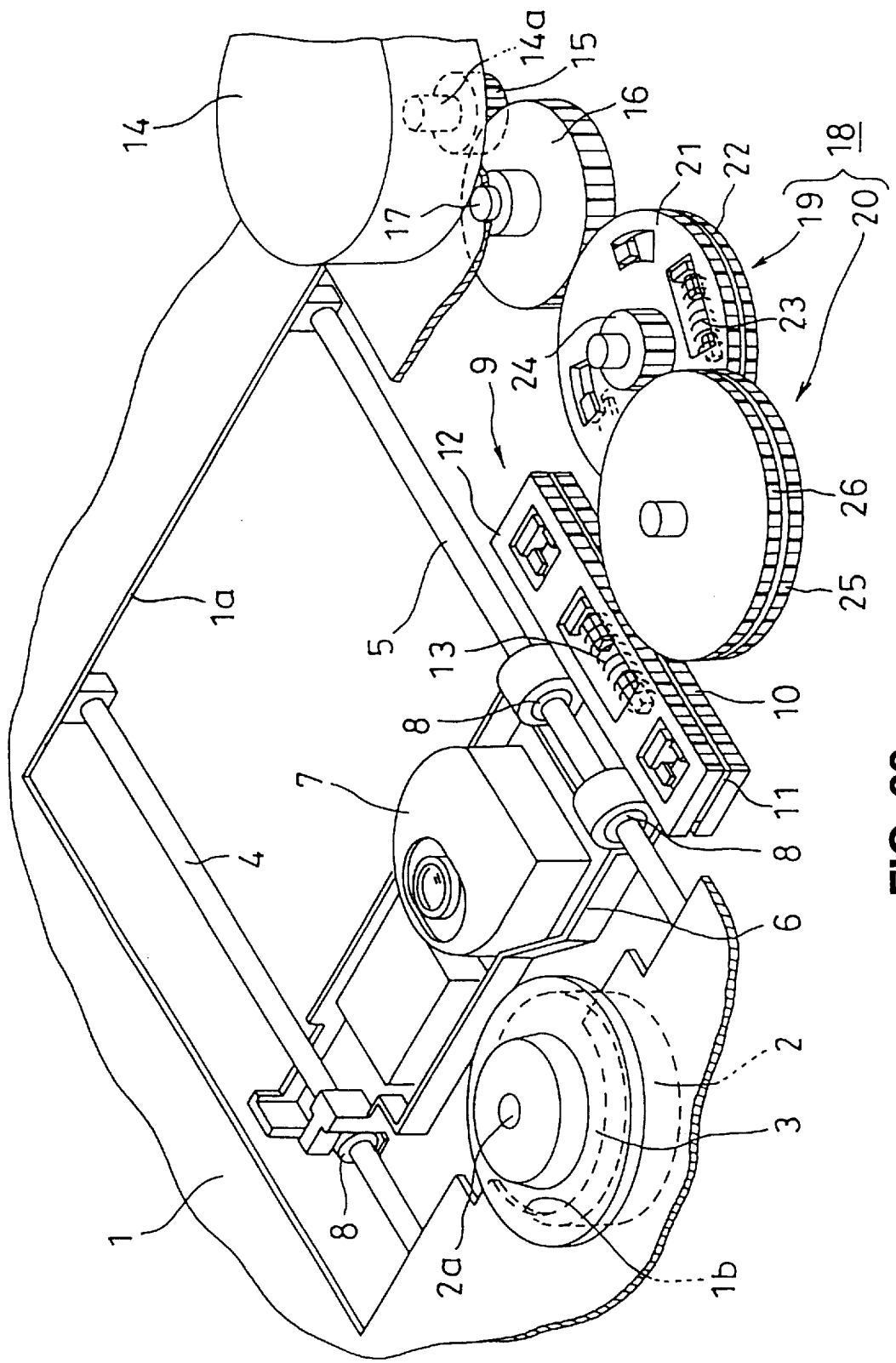
FIG. 39 is a perspective view illustrating a head carriage and a transmission mechanism for driving the head carriage in the prior art disk unit.

In the disk-tray loading state shown in FIG. 38, when inserting the emergency eject member 107 through the emergency eject hole 102b of the front panel 102 in the direction of the arrow a, the top end of the emergency eject member 107 is forced onto the slider 112 provided for emergency ejecting operation as shown in FIG. 32, and then the slider 112 is pushed out in the direction of the arrow a from the position indicated by one-dotted line of FIG. 32 to the position indicated by the solid line by the distance L$_2$.

As a results the cam lever 118 rotates in the direction of the arrow g from the position indicated in FIG. 27 to the position indicated in FIG. 25, and thus the ejecting operation of the disk tray 104 is made, and additionally the unit holder 40 rotates in the direction of the arrow c from the descended position indicated in FIG. 36 to the descended position indicated in FIG. 35 by the aid of dead load in synchronization with rotational movement of the holder driving lever 110, in order to perform the chucking release operation of the disk table 57 to the optical disk D.

After the chucking release to the optical disk D, the guide pin 117c of the gear base 117 turning in the direction of the arrow e, pushes the circular surface 108b$_1$ of the first circular portion 108 of the disk tray 104 in the direction of the arrow f. At this time, the disk tray 104 is pushed out of the casing 101 by the distance L$_1$ in the direction of the arrow b by the component force $F_1$ created by the cam action and acting in the direction of the arrow b.

Thereafter, the emergency eject operation terminates by manually pulling more of the disk tray out of the casing 101 in the direction of the arrow b, grasping the front panel 106 of the disk tray 104, as shown in FIG. 37.

In the embodiment, since the invention is exemplified in case of an optical disk unit for recording and reproducing an optical disk D by utilizing a disk tray 104, the concept of the invention cannot be limited to such an example. The invention can be applied for an optical disk unit for recording and reproducing the optical disk (not shown) in a disk cartridge (not shown).

In the embodiment, although the drive-gear mechanism 59 has a sole rive gear 59a, the invention is applied for a drive-gear mechanism having a plurality of drive gears (not shown).

Materials forming respective components in the unit according to the invention are not limited to the materials described in the embodiment.

Moreover, in the embodiment, the invention is exemplified in case that the drive-gear mechanism 59 is linked to the motor gear 58a after driven-side transmission mechanism 62 is linked to the rack 55, according to another aspect of the invention, the driven-side transmission mechanism 62 may be linked to the rack 55 after linking the drive gear 59a to the motor gear 58a.

What is claimed is:

1. A disk unit, comprising:
    a motor;
    a drive gear mechanism having a drive gear which is driven by said motor;
    an intermediate transmission mechanism; and
    a head carriage having a movable rack;
    wherein said intermediate transmission mechanism includes:
        (i) a driving-side transmission mechanism having a plurality of transmission e mounted on a first common spindle, with said driving-side transmission gears being driven by rotation of said drive gear;
        (ii) a first backlash eliminating means connected directly to the transmission gears of said driving-side transmission mechanism for eliminating backlash between said drive gear mechanism and said intermediate transmission mechanisms;
        (iii) a second backlash eliminating means connected directly to the transmission gears of said driving-side transmission mechanism for eliminating backlash between said intermediate transmission mechanism and said rack; and
        (iv) a driven-side transmission mechanism having a plurality of transmission gears mounted on a second common spindle, with one of said driven-side transmission gears being in meshed engagement with said rack.

2. A disk unit as claimed in claim 1, wherein each of the first and second backlash eliminating means includes a coil spring.

3. A disk unit as claimed in claim 1, further comprising a support shaft in parallel with an axial line of said plurality of transmission gears of both said driving-side and driven-side transmission mechanisms, wherein the rack is rotatably supported on the head carriage through the support shaft.

* * * * *

UNITED STATES PATENT AND TRADEMARK OFFICE
CERTIFICATE OF CORRECTION

PATENT NO. : 5,886,977
DATED : March 23, 1999
INVENTOR(S) : TOSHIRO OTA ET AL.

It is certified that error appears in the above-identified patent and that said Letters Patent is hereby corrected as shown below:

Column 26, line 6, change "transmission e mounted" to --transmission gears mounted--.

Signed and Sealed this

Thirty-first Day of August, 1999

Attest:

Q. TODD DICKINSON

*Attesting Officer*   *Acting Commissioner of Patents and Trademarks*